US008995792B2

(12) United States Patent
Hatano

(10) Patent No.: US 8,995,792 B2
(45) Date of Patent: Mar. 31, 2015

(54) IMAGE PROCESSOR, IMAGE PROCESSING METHOD, AND DIGITAL CAMERA

(71) Applicant: Panasonic Corporation, Osaka (JP)

(72) Inventor: Toshinobu Hatano, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/089,429

(22) Filed: Nov. 25, 2013

(65) Prior Publication Data

US 2014/0085498 A1    Mar. 27, 2014

Related U.S. Application Data

(63) Continuation of application No. PCT/JP2012/003438, filed on May 25, 2012.

(30) Foreign Application Priority Data

May 31, 2011  (JP) ................................ 2011-122427

(51) Int. Cl.
*G06K 9/32*     (2006.01)
*H04N 5/235*    (2006.01)
(Continued)

(52) U.S. Cl.
CPC ............. *H04N 5/23219* (2013.01); *H04N 9/07* (2013.01); *H04N 5/23212* (2013.01);
(Continued)

(58) Field of Classification Search
USPC ......... 348/143–160, 169–172, 207.99–207.2, 348/221.1, 222.1, 231.99–231.9, 234–239, 348/266–324, 333.01–333.12, 345–357, 348/362–368, 578–582; 382/103, 118, 190, 382/232–253, 293–300
See application file for complete search history.

(56) References Cited

U.S. PATENT DOCUMENTS 6,262,769 B1 *  7/2001  Anderson et al. .......... 348/333.1
6,417,883 B1 *  7/2002  Kaneda ........................ 348/350
(Continued)

FOREIGN PATENT DOCUMENTS

JP    2001-245141 A    9/2001
JP    2002-084547 A    3/2002
(Continued)

OTHER PUBLICATIONS

International Search Report issued in International Application No. PCT/JP2012/003438 mailed Aug. 28, 2012, with English translation, 3 pages.

*Primary Examiner* — Michael Osinski
(74) *Attorney, Agent, or Firm* — McDermott Will & Emery LLP

(57) ABSTRACT

A digital camera includes: a horizontal reduction (resizing) processor 301 for reducing a RAW image from single-sensor color imaging device to an image corresponding to a video recording size in an input line direction; a memory section 303 storing horizontally resized image data; a plurality of vertical reduction (resizing) processors 304, 306, and 308 reducing (resizing), in a vertical direction orthogonal to the input line direction, a plurality of pieces of reduced line data read out from the memory section 303; and horizontal reduction (resizing) processors 310 and 312 reducing a plurality of images reduced (resized) in the horizontal and vertical directions back into images of a display size and a face detection size in the input line direction.

13 Claims, 10 Drawing Sheets

(51) Int. Cl.
  *H04N 9/68* (2006.01)
  *G03B 13/00* (2006.01)
  *H04N 5/232* (2006.01)
  *H04N 5/238* (2006.01)
  *H04N 9/07* (2006.01)
  *H04N 9/04* (2006.01)
  *H04N 9/70* (2006.01)
  *H04N 19/85* (2014.01)
  *H04N 19/59* (2014.01)
  *H04N 19/423* (2014.01)
  *H04N 19/436* (2014.01)

(52) U.S. Cl.
  CPC .......... *H04N 5/23296* (2013.01); *H04N 9/045* (2013.01); *H04N 9/70* (2013.01); *H04N 19/423* (2014.11); *H04N 19/436* (2014.11); *H04N 19/85* (2014.11); *H04N 19/59* (2014.11)
  USPC ........ 382/298; 348/221.1; 348/234; 348/349; 348/364

(56) References Cited

U.S. PATENT DOCUMENTS

| | | | |
|---|---|---|---|
| 7,884,874 B2* | 2/2011 | Sugimoto | 348/333.12 |
| 8,077,252 B2* | 12/2011 | Fukugawa et al. | 348/354 |
| 8,111,331 B2* | 2/2012 | Arnao et al. | 348/581 |
| 8,223,219 B2* | 7/2012 | Hatano | 348/222.1 |
| 2002/0044778 A1 | 4/2002 | Suzuki | |
| 2002/0057843 A1* | 5/2002 | Matsubara | 382/240 |
| 2003/0218682 A1* | 11/2003 | Lim et al. | 348/333.11 |
| 2005/0140990 A1* | 6/2005 | Ueno et al. | 358/1.2 |
| 2005/0163389 A1* | 7/2005 | Ohmi et al. | 382/253 |
| 2005/0190976 A1* | 9/2005 | Todoroki et al. | 382/236 |
| 2006/0132628 A1 | 6/2006 | Suzuki | |
| 2006/0188130 A1* | 8/2006 | Park et al. | 382/103 |
| 2006/0256217 A1* | 11/2006 | Hatano | 348/272 |
| 2007/0047828 A1 | 3/2007 | Ishii et al. | |
| 2007/0127095 A1* | 6/2007 | Sugimori | 358/520 |
| 2007/0268394 A1* | 11/2007 | Nonaka et al. | 348/333.12 |
| 2008/0068487 A1* | 3/2008 | Morita | 348/333.05 |
| 2009/0010501 A1* | 1/2009 | Ogawa | 382/118 |
| 2009/0073285 A1* | 3/2009 | Terashima | 348/231.99 |
| 2009/0116705 A1* | 5/2009 | Suzuki et al. | 382/118 |
| 2009/0160992 A1 | 6/2009 | Inaba et al. | |
| 2009/0185760 A1* | 7/2009 | Okada et al. | 382/299 |
| 2009/0245575 A1* | 10/2009 | Hu | 382/103 |
| 2009/0251564 A1* | 10/2009 | Ito | 348/231.2 |
| 2010/0007763 A1* | 1/2010 | Yokohata | 348/222.1 |
| 2010/0020210 A1* | 1/2010 | Tsunekawa et al. | 348/294 |
| 2010/0091135 A1* | 4/2010 | Iwamoto | 348/229.1 |
| 2011/0007191 A1* | 1/2011 | Song et al. | 348/240.99 |
| 2011/0058064 A1 | 3/2011 | Hatano | |
| 2011/0216230 A1 | 9/2011 | Suzuki | |
| 2012/0236164 A1* | 9/2012 | Nakano | 348/208.1 |
| 2012/0328155 A1* | 12/2012 | Fukuda | 382/103 |
| 2013/0083222 A1* | 4/2013 | Matsuzawa et al. | 348/240.3 |
| 2013/0194449 A1 | 8/2013 | Suzuki | |
| 2013/0286240 A1* | 10/2013 | Kim et al. | 348/222.1 |
| 2013/0308014 A1* | 11/2013 | Li | 348/231.3 |
| 2014/0010477 A1* | 1/2014 | Kotani et al. | 382/298 |
| 2014/0078338 A1* | 3/2014 | Hatano | 348/222.1 |

FOREIGN PATENT DOCUMENTS

| | | |
|---|---|---|
| JP | 2003-346143 A | 12/2003 |
| JP | 2007-158509 A | 6/2007 |
| JP | 2009-153013 A | 7/2009 |
| JP | 2009-157733 A | 7/2009 |
| WO | 2010/016166 A1 | 2/2010 |

* cited by examiner

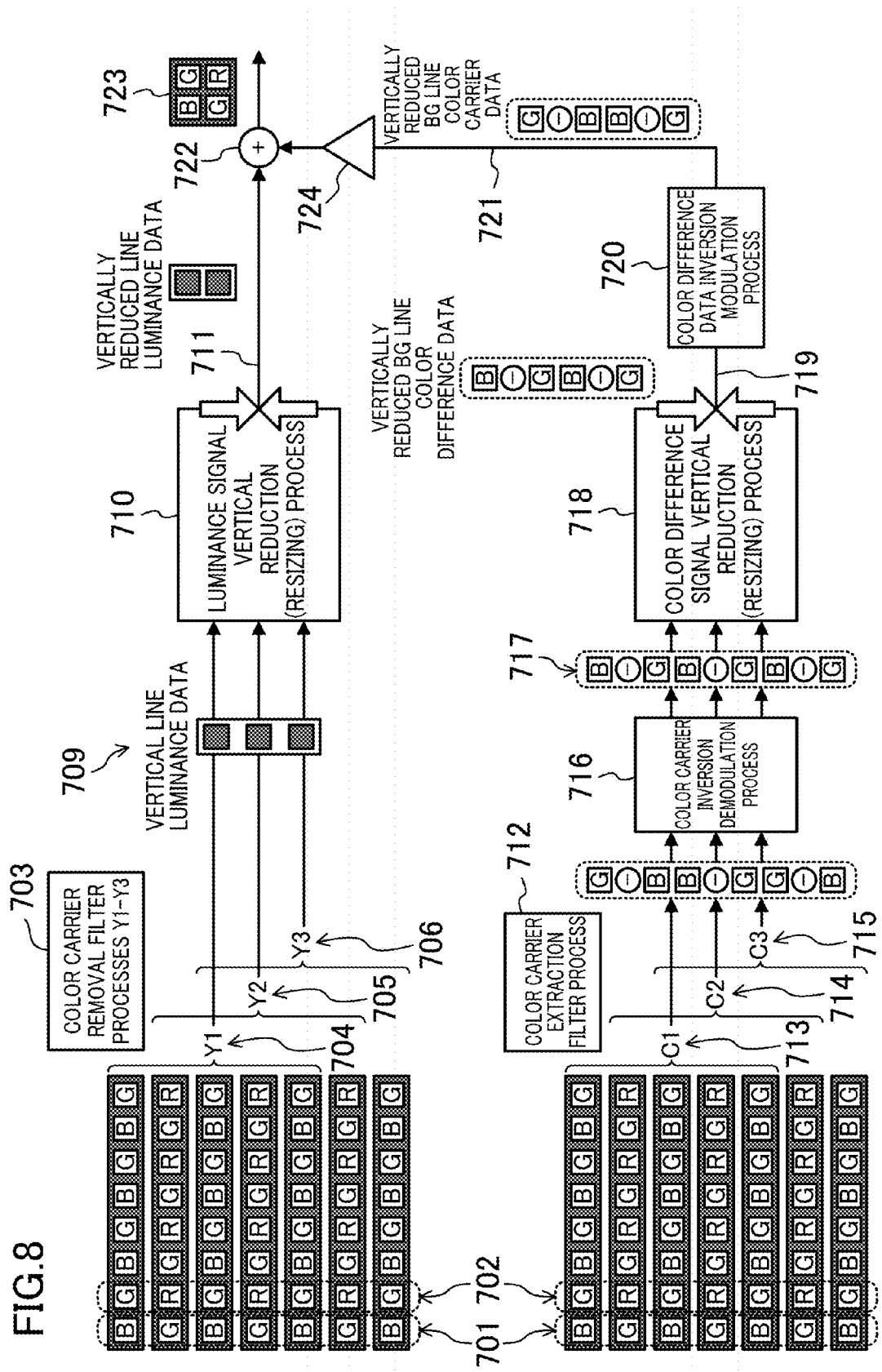

IMAGE PROCESSOR, IMAGE PROCESSING METHOD, AND DIGITAL CAMERA

CROSS-REFERENCE TO RELATED APPLICATIONS

This is a continuation of International Application No. PCT/JP2012/003438 filed on May 25, 2012, which claims priority to Japanese Patent Application No. 2011-122427 filed on May 31, 2011. The entire disclosures of these applications are incorporated by reference herein.

BACKGROUND

The present disclosure relates to image processors, image processing methods, and digital cameras suitable for performing image recognition and feedback operation at high speed with low power consumption in image generation and processing of reduced-size images obtained from an original image with a single-sensor color imaging device.

In the field of recent single-lens reflex digital cameras equipped with large-size imaging devices, single-lens reflex digital cameras requiring neither optical viewfinders nor movable mirrors have attracted attention. A mirror-less single-lens reflex digital camera enables the user to determine a composition of a picture while checking an image of a subject on a liquid crystal display (LCD) monitor, and to take still or video images through automatic focus control and automatic exposure control by using output data from an imaging device. This feature is typically employed in widely used digital cameras and cameras installed in cellular phones.

As described above, a typical digital camera is equipped with a dedicated LCD monitor and can be used when the user determines a composition of a picture while checking an image of a subject on an LCD monitor. At the same time, the camera automatically adjusts exposure and focus in a specified area through face recognition and motion recognition so as to capture still or video images.

An imaging system typified by such a digital camera includes a color separation filter on an imaging device in order to capture color images. A color separation filter known as a Bayer filter, for example, includes primary color filters, i.e., red (R), green (G), and blue (B) color filters, arranged in a square grid, corresponding to pixels of the imaging device. Specifically, in the Bayer pattern, filters of the same color component are placed at every other pixel position along both the sensor-reading and vertical directions of the pixel array. Image data obtained through the color separation filter and serving as an output of the imaging device needs to be handled in a manner that maintains the Bayer pattern in pre-input processing in order to reproduce the colors of the subject.

A small-size image to be displayed is generated from a large-size original image output from an imaging device and is displayed in the following manner. First, the synchronization process of obtaining information on R, G, and B for each pixel is performed with dynamic-range adjustment being performed or white balance being obtained based on an original image. Thereafter, the resulting data is subjected to color image processing to be converted into YCrCb data, which is typically handled. The YCrCb data is then subjected to a reduction (resizing) process to conform to a display size on an LCD monitor. Finally, the resulting data is subjected to a display process to be adjusted in accordance with monitor characteristics. In this manner, the resulting data is displayed on a dedicated monitor.

FIG. 9 is a conceptual view illustrating an internal signal processing block of a typical digital camera.

In FIG. 9, an optical image of a subject that has passed through an optical lens 11 is formed on an imaging device plane, and is output from an imaging device. RAW image data 101 having a Bayer pattern, which is an original image (one surface) of a single-sensor imaging device, is subjected to processes such as DC level adjustment and gain adjustment in a pretreatment section 102, is temporarily written in a memory section 108 via a memory control section 107, is read out from the memory section 108 via the memory control section 107 in a next process, and then is input to an image signal process and reduction (resizing) processor 109. The image signal process and reduction (resizing) processor 109 performs an image signal process of converting a RAW image having a Bayer pattern into a YCrCb data image. The image signal process and reduction (resizing) processor 109 converts the RAW image into the YCrCb data image, and in order to reduce the image to an image size for display, performs a reduction (resizing) process to generate an image of a desired display size. The generated YCrCb data image of a display size is written in the memory section 108 again via the memory control section 107.

At the same time, after the conversion into the YCrCb data image, in order to reduce the image to a size for face detection, the image signal process and reduction (resizing) processor 109 performs a reduction (resizing) process on a luminance signal Y to generate a desired luminance image data for face detection. The luminance image data for face detection from the luminance signal Y is written in the memory section 108 via the memory control section 107, and is suitably read out again from the memory section 108 via the memory control section 107 by a face detection processor 106, and face information such as the position and size of a face in the image is extracted. The extracted information is written in the memory section 108 via the memory control section 107. The face detection information written in the memory section 108 is read out by a CPU 114 via the memory control section 107, is converted into display information indicating a face position. In this manner, display data is generated and written in the memory section 108. At the same time, the CPU 114 automatically adjusts exposure and focus for a specific area based on face recognition information.

The YCrCb data image of a display size written in the memory section 108 is read out from the memory section 108 via the memory control section 107 again, and is input to a display processor 117. At this time, the display information indicating the face position is also read out from the memory section 108, and is input to the display processor 117. The YCrCb data image and the display information indicating the face position that have been input to the display processor 117 are converted to conform to monitor characteristics of a monitor 118 in the display processor 117, and are output to the monitor 118 to be displayed thereon.

Similarly, in the case of recoding a video image of a standardized size, the original image 101 is converted into a YCrCb data image in the image signal process and reduction (resizing) processor 109, and then is subjected to a reduction (resizing) process in the image signal process and reduction (resizing) processor 109, thereby generating an image of a desired video recording size. The generated YCrCb data image is written in the memory section 108 again via the memory control section 107. The YCrCb data image of a video recording size written in the memory section 108 is read out from the memory section 108 via the memory control section 107 again, and is input to a compressor/decompressor 110. The YCrCb data image input to the compressor/decompressor 110 is subjected to data compression using a video image codec method such as MJPEG, MPEG, or H264, and is written in the memory section 108 via the memory control section 107 again. The compressed video data is read out from the memory section 108 via the memory control section 107 again, and is written on a recording medium 112 through a recording medium interface 111.

With respect to the internal signal processing of the digital camera, FIG. 10 illustrates a series of pipeline processes starting from an input of RAW image data.

In FIG. 10, in a first frame period in which RAW image data 101 having a Bayer pattern is input, the pretreatment section 102 performs DC level adjustment, gain adjustment, etc., and results of these processes are temporarily written in the memory section 108 via the memory control section 107. Then, in processing in a second frame period, the RAW image data is read out via the memory control section 107, is input to the image signal process and reduction (resizing) processor 109, and is subjected to an image signal process to be converted into an YCrCb data image.

In the second frame period, the image signal process and reduction (resizing) processor 109 performs a reduction (resizing) process, and generates an image of a desired display size and luminance image data for face detection. The generated YCrCb data image of the display size and luminance image data for face detection are written in the memory section 108 again via the memory control section 107.

Thereafter, in a third frame period, the luminance image data for face detection is suitably read out from the memory section 108 via the memory control section 107 again by the face detection processor 106 via the memory control section 107, and face information such as the position and size of a face in the image is extracted. The extracted information is written in the memory section 108 via the memory control section 107.

Subsequently, in a fourth frame period, the extracted face information written in the memory section 108 is read out by the CPU 114 via the memory control section 107, and the extracted face information indicating the face position is converted into display information data, which is then written in the memory section 108. At the same time, the CPU 114 starts feedback control for automatically adjusting exposure, focus, and image quality for a specific area based on the face recognition information.

As described above, the image processing illustrated in FIGS. 9 and 10 is performed in the following manner. To determine a composition of a picture while checking an image of a subject on an LCD monitor for image capturing, the process of temporarily storing a single type of reduced-size RAW data with an RGB Bayer pattern in a memory, subjecting the data to a color development image process of converting the data into YCrCb data, and then storing the resulting data in the memory again, includes signal processing in which the RAW data is subjected to a reduction (resizing) process to be reduced to the sizes suitable for video recording, face detection, and a display monitor, is written in a memory section, and then is read out from the memory section again to be subjected to a video image compression process, a face detection process, and a display process.

Typically, to confirm the reproducibility of details of a subject, it is necessary to use a large-size image. On the other hand, to confirm a composition of a picture of a subject, brightness, tones of colors, the presence of a halation, etc. on an LCD monitor or to recognize the position and size of a face through face detection when shooting a picture, it is unnecessary to use such a large-size image, and a small-size image is sufficient for the confirmation and the recognition instead.

At present, the number of pixels in an imaging device is increasing and the high-speed read technique is advancing. Under these circumstances, when an image is captured in a record mode called small RAW in which the image is smaller than its original image or when a video image having a standardized size, such as an HD video image, is captured, the size of a RAW image is reduced before processing such as a display process, a face recognition process, and a recording process is performed. This size reduction can remove a redundant process that would otherwise be performed in a subsequent process. As a result, the processing time can be significantly reduced, and operation with low power consumption of the system can be achieved.

In existing techniques of reducing (resizing) a RAW image of RGB with a pretreatment, as presented in, for example, Japanese Unexamined Patent Publications Nos. 2003-346143, 2001-245141, and 2002-84547, color separation into individual pieces of R, G, B data is performed or pixels of the same color are mixed in an initial process for decimation in reducing (resizing) RAW data of RGB as an original image.

SUMMARY

The conventional signal process illustrated in FIGS. 9 and 10 has some problems. Specifically, the process of reducing an image to a plurality of sizes performed after the signal process of converting a single type of a RAW image into a YCrCb data image has the following two problems:

(1) YCrCb data obtained by converting large-size RAW image data through image signal process while maintaining its large-size is temporarily written in a memory, and then is subjected to an image reduction process. The presence of the memory access causes a frame delay in a monitor mode display. In addition, a frame delay caused by pipeline processes performed frame by frame might miss a real-time display conforming to motion of a subject and a good opportunity to take a photograph. Furthermore, a frame delay also occurs in a face detection process. Specifically, in FIG. 10, the face detection process is performed in the third frame period with a frame period in which RAW image data 101 having a Bayer pattern is input being defined as the first frame period. In this case, a feedback process using face detection is delayed accordingly. In particular, in a monitor mode in which a composition of a picture is determined with confirmation of an image of a subject and a video recording mode, when a subject person moves, a shift might occur in setting the position of a specific area with a feedback process of a face detection result.

(2) A reduction (resizing) process is a process for reducing the number of recording images. A reduction (resizing) process performed before image processing, if possible, can reduce the amount of memory access at subsequent processes. However, in the case of performing reduction (resizing) after conversion into a YCrCb data image, as in a conventional technique, the conversion process of converting data that is discarded by decimation into an YCrCb data type is a redundant process. This conversion into an YCrCb data type is performed via a memory buffer, and thus, involves power consumption of an I/O buffer in proportion to the processed amount relative to an image size. Thus, this case is ineffective in terms of power consumption reduction.

Japanese Unexamined Patent Publications Nos. 2003-346143, 2001-245141, and 2002-84547 show the processes of reducing RAW images before processing with an increasing number of pixels of an imaging device and an advancing high-speed read technique capable of handling video recording. However, none these publications discloses a technique of generating a plurality of reduced-size images that are necessary for a subsequent process, at a time in a pretreatment.

As described above, in a video recording mode of shooting with a digital camera in which a composition of a picture is determined with an image of a subject being checked on an LCD monitor, and in which real-time autofocus (AF) and/or autoexposure (AE), for example, is performed with various recognition operations such as face recognition being performed at the same time, a process of conversion into an image of a YCrCb data type through a memory buffer and a plurality of subsequent image reduction processes are redundant, and serve as main factors in causing a frame delay in monitor display and image recognition. In addition, since most of processing functions in an imaging system are operated in a monitor mode or a video mode, redundant processes occurring in subsequent processing are very inefficient in terms of power consumption reduction.

It is therefore an object of the present to provide an image processor that performs a preprocess of reducing and converting a large-size RAW original image from an imaging device directly into a plurality of small-size RAW images in a frame period in which the original image is input, reduces occurrence of subsequent redundant processes, and performs AF/AE feedback control while displaying various results of various types of image recognition obtained through face detection with, for example, a digital camera with a minimum frame delay. This image processor can achieve visual recognition, image-quality adjustment, and recording with a digital camera at high speed with low power consumption.

To achieve the object, in a first aspect of the present disclosure, an image processor for use in an imaging system that generates at least one of a still image or a video image from an original image output from an imaging device and having pixels of a plurality of colors arranged in a color array with a periodicity and records the at least one of the still image or the video image, includes: a pretreatment section configured to generate a plurality of reduced-size images with respect to the original image; a memory section configured to hold the reduced-size images temporarily via a memory control section; a face information detector configured to detect face information via the memory control section with respect to one of the reduced-size images read out from the memory section; and a central processing unit configured to perform at least one of focus control or exposure control for a specific area based on the face information detected by the face information detector, wherein the pretreatment section includes a first horizontal reduction resizing processor configured to reduce, in an input line direction, the original image to a reduced-size image of an arbitrary size, and to store the reduced-size image of the arbitrary size temporarily, a plurality of vertical reduction resizing processors each configured to read the reduced-size image reduced in the input line direction from the memory section by the first horizontal reduction resizing processor, and to reduce the reduced-size image to an image of an arbitrary size in a vertical direction orthogonal to the input line direction, and a plurality of second horizontal reduction resizing processors each configured to reduce reduced-size images reduced in size in the horizontal and vertical directions and obtained by the vertical reduction resizing processors again to images of an arbitrary size in the input line direction.

In a second aspect of the present disclosure, in the image processor of the first aspect, when the pretreatment section generates n types, where n is an integer of four or more, of reduced-size images, the first horizontal reduction resizing processor reduces the original image to an image of a horizontally reduced size of one of the n-types of reduced-size images having a largest horizontal image size, with a ratio K1, one of the vertical reduction resizing processors reduces the reduced-size image reduced with the ratio K1 in the input line direction, with the ratio K1 in the vertical direction, another of the vertical reduction resizing processors reduces the reduced-size image reduced with the ratio K1 in the input line direction, with a ratio K2 in the vertical direction, yet another of the vertical reduction resizing processors reduces the reduced-size image reduced with the ratio K1 in the input line direction, with a ratio K3 in the vertical direction, each of the other (n−3) vertical reduction resizing processors reduces the reduced-size image reduced with the ratio K1 in the input line direction, with a ratio Kn in the vertical direction, the number of the second horizontal reduction resizing processors is n−1, one of the second horizontal reduction resizing processors reduces the reduced-size image reduced with the ratio K2 in the vertical direction, with a coefficient M2 satisfying a relationship of K1*M2=K2 in the input line direction, another one of the second horizontal reduction resizing processors reduces the reduced-size image reduced with the ratio K3 in the vertical direction, with a coefficient M3 satisfying a relationship of K1*M3=K3 in the input line direction, and each of the other second horizontal reduction resizing processors reduces the reduced-size image reduced with the ratio Kn in the vertical direction, with a coefficient Mn satisfying a relationship of K1*Mn=Kn in the input line direction.

In a third aspect of the present disclosure, in the image processor of the first or second aspect, when the pretreatment section generates a reduced-size image for face detection from the original image, the pretreatment section generates a reduced image of a luminance signal component having no color carrier components by performing: a color carrier removal process in the input line direction; and a color carrier removal process in the vertical direction.

In a fourth aspect of the present disclosure, in the image processor of any one of the first through third aspects, among the plurality of reduced-size images generated by the pretreatment section, an image having a largest horizontal image size is an image for video recording conforming to a high-definition video standard, and each of the other reduced-size image(s) is an image for display or image recognition such as face recognition.

In a fifth aspect of the present disclosure, image processor of any one of the first through fourth aspects, the original image is an image obtained by using a single-sensor color imaging device and has a plurality of pixels of colors arranged in a color array with a periodicity through a primary color filter.

In a sixth aspect of the present disclosure, in the image processor of any one of the first through fifth aspects, the pretreatment section generates a plurality of reduced-size images in a first frame period in which the original image is input to the image processor, and the face information detector detects face information in a second frame period subsequent to the first frame period.

In a seventh aspect of the present disclosure, an image processing method for use in an imaging system that generates at least one of a still image or a video image from an original image output from an imaging device and having pixels of a plurality of colors arranged in a color array with a periodicity and records the at least one of the still image or the video image, includes: a pretreatment step of generating a plurality of reduced-size images with respect to the original image; a face information detection step of detecting face information with respect to one of the reduced-size images; and an imaging control step of performing at least one of focus control or exposure control for a specific area based on the face information detected in the face information detection step, wherein the pretreatment step include a first horizontal reduction resizing process of reducing, in an input line direction, the original image to an image of an arbitrary size, a plurality of vertical reduction resizing processes of each reducing the reduced-size image that has been reduced in the input line direction in the first horizontal reduction resizing process to an image of an arbitrary size in a vertical direction orthogonal to the input line direction, and a plurality of second horizontal reduction resizing processes of each reducing reduced-size images that have been reduced in size in the horizontal and vertical directions and obtained in the vertical reduction resizing processes again to images of an arbitrary size in the input line direction.

In an eighth aspect of the present disclosure, in the method of the seventh aspect, when n-types, where n is an integer of four or more, of reduced-size images are generated in the pretreatment step, in the first horizontal reduction resizing process, the original image is reduced to an image of a horizontally reduced size of one of the n-types of reduced-size images having a largest horizontal image size, with a ratio K1, in one of the vertical reduction resizing processes, the reduced-size image that has been reduced with the ratio K1 in the input line direction, is reduced with the ratio K1 in the vertical direction, in another of the vertical reduction resizing processes, the reduced-size image that has been reduced with the ratio K1 in the input line direction is reduced with a ratio K2 in the vertical direction, in yet another of the vertical reduction resizing processes, the reduced-size image that has been reduced with the ratio K1 in the input line direction is reduced with a ratio K3 in the vertical direction, in each of the other (n−3) vertical reduction resizing processes, the reduced-size image that has been reduced with the ratio K1 in the input line direction is reduced with a ratio Kn in the vertical direction, the number of the second horizontal reduction resizing processes is n−1, in one of the second horizontal reduction resizing processes, the reduced-size image that has been reduced with the ratio K2 in the vertical direction is reduced in the input line direction with a coefficient M2 satisfying a relationship of K1*M2=K2, in another of the second horizontal reduction resizing processes, the reduced-size image that has been reduced with the ratio K3 in the vertical direction is reduced in the input line direction with a coefficient M3 satisfying a relationship of K1*M3=K3, in each of the other (n−3) second horizontal reduction resizing processes, the reduced-size image that has been reduced with the ratio Kn in the vertical direction is reduced in the input line direction with a coefficient Mn satisfying a relationship of K1*Mn=Kn.

In a ninth aspect of the present disclosure, in the method of the ninth aspect, in the pretreatment step, when generating a reduced-size image for face detection from the original image, a reduced-size image of a luminance signal component having no color carrier components is generated by performing: a color carrier removal process concurrently with the first horizontal reduction resizing process; and a color carrier removal process concurrently with the vertical reduction resizing process.

In a tenth aspect of the present disclosure, in the method of any one of the seventh through ninth aspects, among the plurality of reduced-size images generated in the pretreatment step, an image having a largest horizontal image size is an image for video recording conforming to a high-definition video standard, and each of the other reduced-size image(s) is an image for display or image recognition such as face recognition.

In an eleventh aspect of the present disclosure, in the method of the seventh through tenth aspects, the original image is an image obtained by using a single-sensor color imaging device and has a plurality of pixels of colors arranged in a color array with a periodicity through a primary color filter.

In a twelfth aspect of the present disclosure, in the method of any one of the seventh through eleventh aspects, in the pretreatment step, a plurality of reduced-size images are generated in a first frame period in which the original image is input in the pretreatment step, and in the face information detection step, face information is detected in a second frame period subsequent to the first frame period.

In a thirteenth aspect of the present disclosure, a digital camera includes the image processor of any one of the first through sixth aspects.

As described above, according to the present disclosure, in a video recording mode of shooting with a digital camera in which a composition of a picture is determined with an image of a subject being checked, and in which real-time autofocus (AF) and/or autoexposure (AE), for example, is performed with various recognition operations such as face recognition being performed at the same time, a plurality of reduced-size RAW images, including a small-size RAW image for display, a RAW image of a video recording size, and a small-size luminance image for image recognition such as face detection, are generated at a time in a preprocess directly from a large-size RAW original image output from an imaging device in a frame period in which the original image is input. Thus, RAW image data pieces of difference sizes can be generated at a time in a preprocess. Consequently, the load in the processes requiring memory access can be reduced, leading to fewer occurrences of subsequent redundant processes. In addition, since AF/AE feedback control can be performed with results of various types of image recognition being displayed with a minimum frame delay, operations with a digital camera such as display, visual recognition, image-quality adjustment, and recording can be achieved at high speed with low power consumption.

As described above, an image processor and an image processing method according to the present disclosure can generate RAW image data pieces of different sizes, such as luminance data for face detection, for different purposes at a time in a frame period in which an original image is input in shooting with, for example, a digital camera. Thus, results of various types of image recognition obtained through face detection can be displayed with a minimum frame delay.

BRIEF DESCRIPTION OF THE DRAWINGS

FIG. 8 illustrates an example of internal processing of vertical reduction (resizing) processors that reduce (resize) a plurality of horizontally reduced pieces of line data in a vertical direction orthogonal to the input line direction.

DETAILED DESCRIPTION

Preferred embodiments of an image processor, an image processing method, and an image processing program according to the present disclosure will be described with reference to the drawings.

Figure 1:
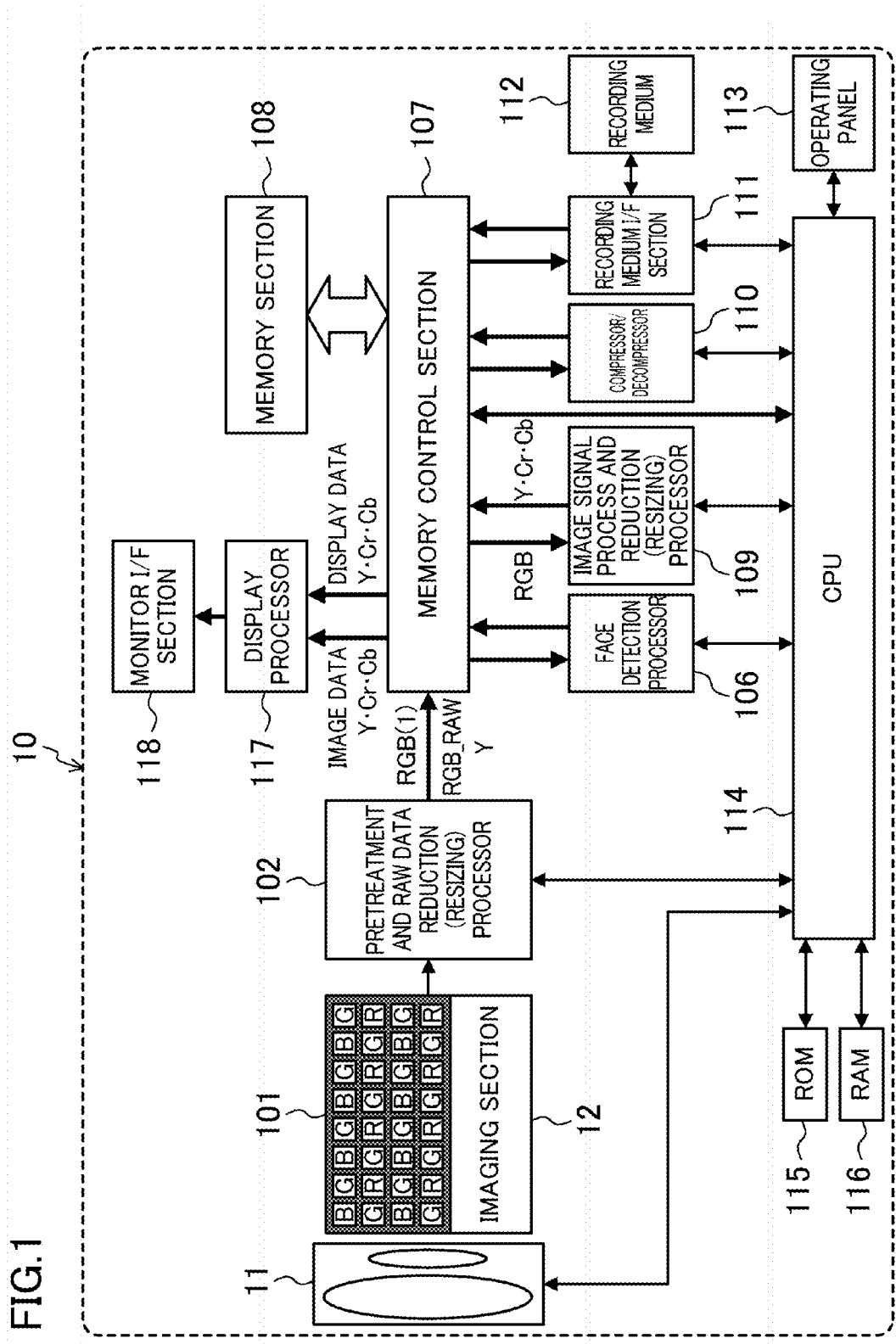
FIG. 1 illustrates an overall configuration of an imaging system according to an embodiment of the present disclosure.

FIG. 1 illustrates a configuration of an imaging system including an image processor according to an embodiment of the present disclosure.

In FIG. 1, an imaging system 10 is a single-sensor digital camera that converts an optical image of a subject captured through an imaging section 12 into digital image data and records the digital image data on a recording medium 112.

The imaging section 12 includes a large number of imaging devices (not shown) typified by, for example, a CCD device or a CMOS device. The imaging devices have light-receiving surfaces on each of which photodiodes (photosensitive pixels) are two-dimensionally arranged and perform photoelectric conversion on subject information that has passed through an optical lens 11.

Each of the imaging devices has a color filter (not shown) having a predetermined color array in which one of R, G, or B is located at a position corresponding to each pixel, and selects colors of light incident on photodiodes serving as photoreceivers. This embodiment employs a Bayer pattern as an example.

Image data from the imaging section 12 is called a RAW image, which is a digital signal obtained by an A/D conversion process. The RAW image data (original image data) 101 having a Bayer pattern is obtained with a structure in which photoreceivers are arranged in a square matrix, occurring at a predetermined pitch along both of the row and column directions (i.e., the color filters occur at every square position along both of the row and column directions of a square grid). Note that, in an actual imaging surface of the imaging device, the structure of the pixel array of the RAW image data 101 having the Bayer pattern is periodically repeated along both of the sensor-reading and vertical directions. Of course, the color filter array structure of the present disclosure is not limited to the Bayer pattern, and a variety of array structures, such as a G-stripe, may be employed. In this embodiment, the primary color filter is used. Alternatively, a complementary color filter including yellow (Y), magenta (M), cyan (C), and green (G) color filters may be employed. Moreover, a primary color filter and a complementary color filter may be combined in any manner, or a white (W) color filter may be employed.

The RAW image data 101 obtained by A/D conversion is recorded on the recording medium 112 based on an operation mode of the imaging system 10 through necessary signal processing or without signal processing. In a shooting mode, an image of a subject is displayed on a monitor 119 through a display processor 117 and a monitor interface (I/F) section 118. The imaging system 10 of this embodiment is capable of recording a still image in a JPEG format in a shooting mode and recording a compressed video image in, for example, an MPEG format. In addition, the imaging system 10 is capable of recording the RAW image data 101 itself immediately after A/D conversion.

In the case of JPEG-format recording, the image data 101 obtained by the A/D conversion is sent to the image signal process and reduction (resizing) processor 109 via a pretreatment and RAW data reduction (resizing) processor 102. The pretreatment and RAW data reduction (resizing) processor 102 and the image signal process and reduction (resizing) processor 109 perform various processes, such as a synchronization process (of calculating the color of each point by interpolation for a spatial gap between chrominance signals in the color filter array), while balance (WB) adjustment, gamma correction, generation of a luminance signal and a color-difference signal, contour enhancement, scaling (enlargement/reduction) by an electronic zooming function, conversion of the number of pixels (resizing), on an image signal in accordance with a command from a central processing unit (CPU) 114. The pretreatment and RAW data reduction (resizing) processor 102 and the image signal process and reduction (resizing) processor 109 perform the processes on an image signal by using a memory section 108 capable of temporarily recording an image that is being processed via a memory controller 107.

In the pretreatment and RAW data reduction (resizing) processor 102 and the image signal process and reduction (resizing) processor 109, image data subjected to predetermined signal processing is sent to the compressor/decompressor 110 and compressed in accordance with a JPEG compression format. Note that the compression format is not limited to JPEG, and any other formats, such as MPEG, may be employed. That is, a compression process corresponding to the compression format may be used.

The compressed image data is recorded on the recording medium 112 via a recording medium I/F section 111. The recording medium 112 is not limited to semiconductor memories, such as a memory card. Various other media, such as a magnetic disk, an optical disk, and an optomagnetic disk, may be employed. The recording medium 112 is not limited to removable media, either, and may be incorporated in the imaging device 10 (e.g., may be an internal memory).

On the other hand, in a mode in which a RAW image is recorded, the RAW image data 101 is recorded on the recording medium 112 via the memory controller 107 and the recording medium I/F section 111 without being subjected to synchronization and the other signal processes. Specifically, the RAW image data 101 is an image that has not been subjected to signal processes such as gamma correction, white balance adjustment, and synchronization, and a mosaic image in which a piece of color information is stored for each pixel and the color varies from pixel to pixel in accordance with the array pattern of the color filter. Of course, no compression process has been performed, and therefore, the image data has a large file size. Note that when the RAW image data 101 is recorded on the recording medium 112, the RAW image data 101 may be reversibly compressed and recorded or may be recorded without compression.

The CPU 114 is a control section that performs a centralized control of the imaging device 10 in accordance with a predetermined program. The CPU 114 controls operation of each circuit in the imaging device 10 based on a command signal from an operating panel 113. A ROM 115 stores a program to be executed by the CPU 114 and various types of data required for control, for example. A RAM 116 is used as a working area for the CPU 114.

The operating panel 113 is used by the user to input various commands to the imaging system 10. For example, the operating panel 113 includes various operating means, such as a mode select switch for selecting the operation modes of the imaging system 10, a cross key for inputting a command to select a menu item (move a cursor), a command to move a reproduced image forward or backward by a frame-by-frame basis, etc., an execution key for inputting a command to confirm (register) a selected item or a command to execute an operation, a cancel key for erasing a desired target, such as a selected item, or cancelling a command, a power switch, a zoom switch, and a shutter-release switch. Each of the switches is also implemented as an area switch on a touch panel.

The CPU 114 controls the imaging section 12 including the imaging device based on various shooting settings (e.g., exposure settings, the presence or absence of strobe flash, and a shooting mode) in accordance with a command signal input from the operating panel 113. The CPU 114 also performs automatic exposure (AE) control, automatic focus adjustment (AF) control, automatic white balance (AWB) control, lens drive control, image processing control, and control of reading or writing of the recording medium 112, for example.

For example, the CPU 114 performs the automatic focus adjustment (AF) control when detecting that the shutter-release switch is pressed halfway down, and starts the exposure control and the read control to capture an image to be recorded when detecting that the shutter-release switch is pressed all the way down. The CPU 114 also optionally sends a command to a strobe control circuit (not shown) to control light emission of a flashtube (a light emission section), such as a xenon flashtube.

The pretreatment section 102 includes an automatic calculator (not shown) that performs calculation required for the AE control and AF control. In the case of capturing a still image, the pretreatment section 102 performs focus evaluated value calculation and AE calculation, for example, based on an image signal captured in response to a halfway-push of the shutter-release switch, and sends a result of the calculation to the CPU 114. When detecting that the shutter-release switch is pressed all the way down, the CPU 114 controls a lens drive motor (not shown) based on the result of the focus evaluated value calculation to move the optical lens 101 to a focus position, and also controls a diaphragm and an electrical shutter to adjust exposure. Image data thus captured is recorded on the recording medium 112 in accordance with a recording mode. In the case of capturing a video image, the above-described processing is continuously performed while the video image is recorded.

The face detection processor (the face information detector) 106 detects face information by using an image that has been resized to an image size for face detection. In this embodiment, the face detection is performed by using a luminance data image (Y) of a size for face detection, which is one of data pieces obtained by performing a reduction (resizing) process on the RAW original image data 101 in the pretreatment section 102.

The face detection processor 106 reads the luminance data image (Y) of the face detection size from the memory section 108 via the memory control section 107 in a suitable manner, extracts face information such as the position and size of a face in the image, and writes the extracted information in the memory section 108 via the memory control section 107. The CPU 114 reads the face detection information written in the memory section 108 via the memory control section 107, converts the information into display information indicating the position of the face, generates display data, and writes the display data in the memory section 108. In addition, the face detection information is processed by the CPU 114, together with information obtained from the automatic calculator that performs calculation required for the AE control and the AF control. Based on a result of the focus evaluated value calculation with respect to the position of a person, a lens drive motor (not shown) is controlled to move the optical lens 11 to the focus position, and the diaphragm and the electronic shutter are controlled to adjust exposure.

The display processor 117 receives a YCrCb data image of a display size written in the memory section 108 after image processing in the image signal process and reduction (resizing) processor 109, via the memory control section 107. At the same time, the display data indicating information on the face position is also read out from the memory section 108 and is input to the display processor 117.

The YCrCb data image and the display data indicating the face position information, which have been input to the display processor 117, are converted into an input data type conforming to characteristics of the monitor in the display processor 117. The resulting data is input to the monitor 119 via the monitor I/F section 118, and is displayed on the monitor 119.

(A Flow of Signal Processing in Imaging System of this Embodiment)

Figure 2:
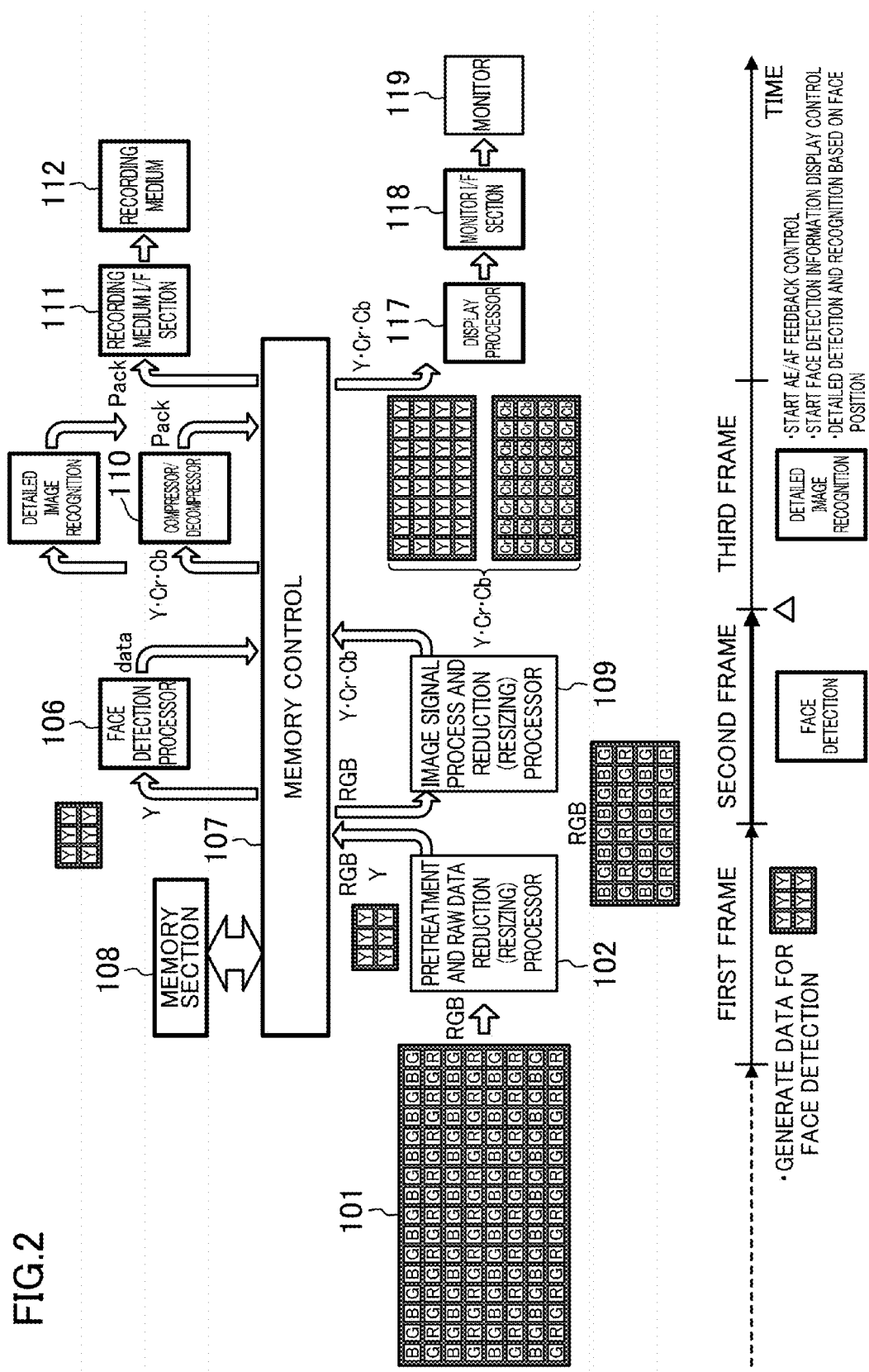
FIG. 2 illustrates a flow of image processing in the imaging system.

FIG. 2 illustrates a series of pipeline processes starting from the time of an input of RAW image data in internal signal processing of the digital camera of this embodiment.

In FIG. 2, in a first frame period in which the RAW original image data 101 having the Bayer pattern is input, processing of the pretreatment and RAW data reduction (resizing) processor 102 includes a reduction (resizing) process of reducing (resizing) the RAW image data 101 into a plurality of data pieces with different sizes, which is a feature of this embodiment. A luminance data image (Y) of a size for face detection, which is one of the data pieces obtained by the reduction (resizing) process, is temporarily written in the memory section 108 via the memory control section 107, together with RAW data of a reduced size in another Bayer pattern.

In a second frame period, reduced-size RAW data for display having the Bayer pattern is read out from the memory section 108 via the memory control section 107, is input to the image signal process and reduction (resizing) processor 109, and is subjected to an image signal process of converting the RAW image 101 into an image of a YCrCb data type. The generated YCrCb data image of a display size is written in the memory section 108 again via the memory control section 107.

At the same time, in the second frame period, the luminance image data (Y) for face detection is read out again in a suitable manner from the memory section 108 via the memory control section 107 by the face detection processor 106 via the memory control section 107, and face information such as the position and size of a face in the image is extracted and detected. The detected information is written in the memory section 108 via the memory control section 107.

In a third frame period, the CPU 114 reads the face detection result information written in the memory section 108 via the memory control section 107, converts detection result information indicating the face position into display information data based on the detection result information, and writes the data in the memory section 108. At the same time, based on the face recognition information, the CPU 114 starts feedback control for automatically adjusting exposure, focus, and image quality of a specific area.

(Specific Example of Reduction (Resizing) Process of Multiple Sizes)

Now, it will be described how a reduction (resizing) process for different sizes is performed on RAW original image data in the pretreatment and RAW data reduction (resizing) processor 102, which is a feature of this embodiment, in the imaging system 10 illustrated in FIGS. 1 and 2.

Figure 3:
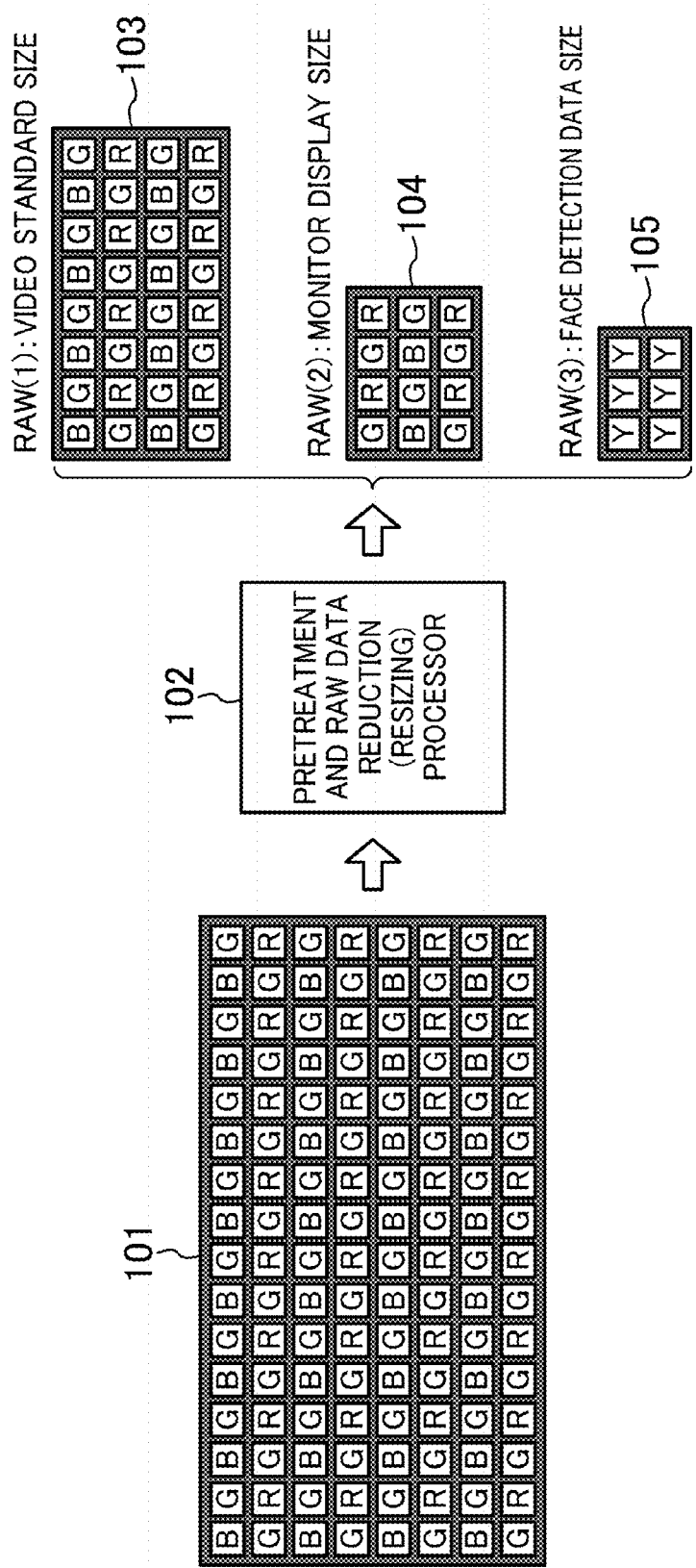
FIG. 3 schematically illustrates the image processing.

FIG. 3 schematically illustrates image processing of this embodiment in which a plurality of reduced-size images are generated from the RAW image data 101 at the same time.

In FIG. 3, the pretreatment and RAW data reduction (resizing) processor 102 converts the RAW image data 101 obtained by the single-sensor color imaging device into: RAW image data 103 of a size conforming to the high-definition video standard; RAW image data 104 of a monitor display size; and luminance (Y) image data 105 of a data size for face detection. A feature of this embodiment is that a plurality of reduced-size images can be generated, by pipeline processes performed within a reading frame period of the imaging device, from the RAW image data 101 that is read out from the imaging device of the imaging section 12 frame by frame in a monitor mode or a video image shooting mode. The structure and operation thereof will now be described.

(Internal Configuration of Pretreatment/RAW Data Resizing Processor 102)

Figure 4:
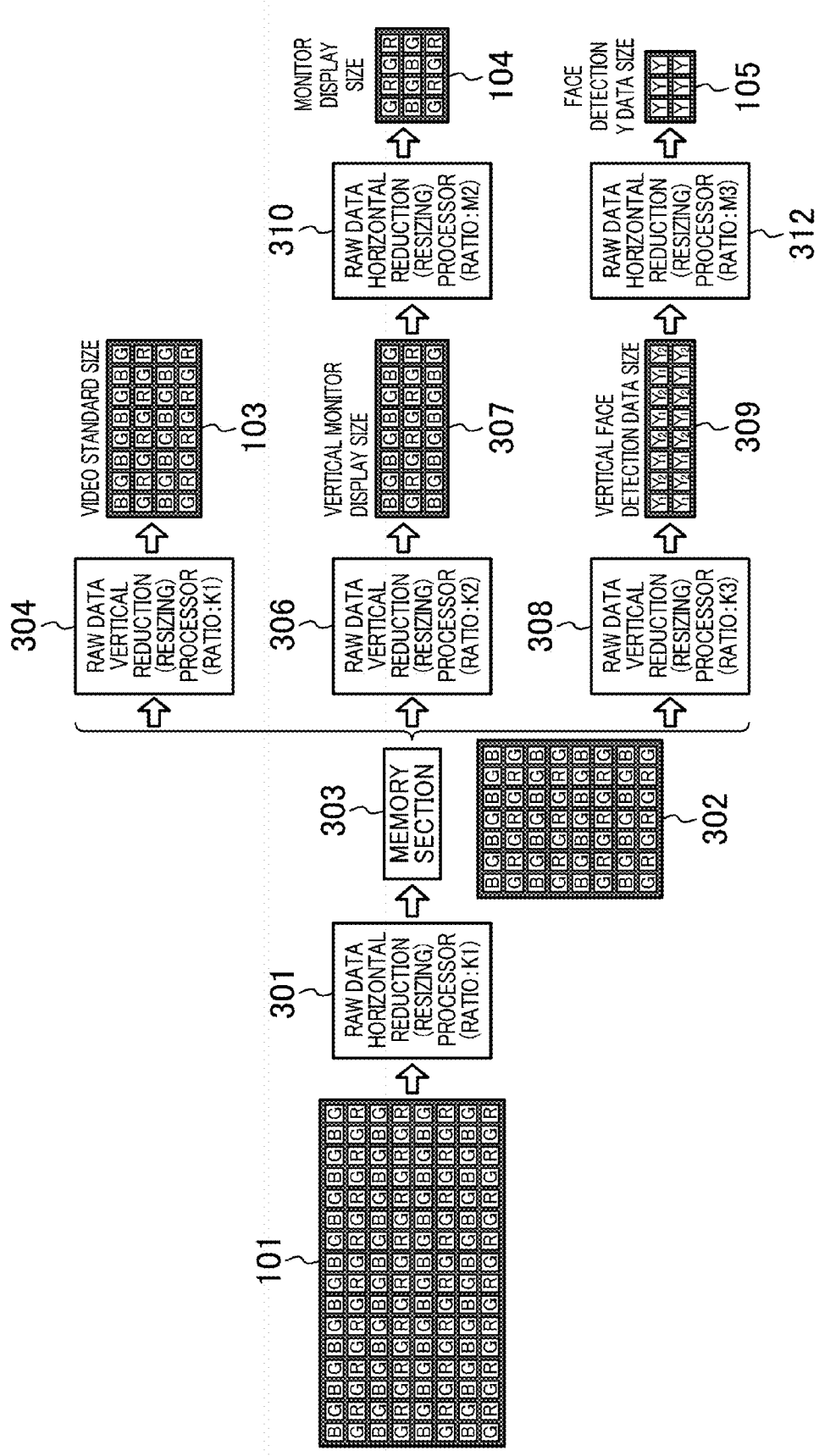
FIG. 4 schematically illustrates internal processing of generating RAW image data of a video standard size, RAW image data of a monitor display size, and luminance (Y) image data of a data size for face detection in the imaging system.

FIG. 4 schematically illustrates an internal configuration of the pretreatment and RAW data reduction (resizing) processor 102 that generates the RAW image data 103 of the video standard size, the RAW image data 104 of the monitor display size, and the luminance (Y) image data 105 of the face detection data size, as an example of generation of images with different sizes.

As illustrated in FIG. 4, the image processing of this embodiment includes a first horizontal reduction (resizing) processor 301, a memory section 303, three types of vertical reduction (resizing) processors 304, 306, and 308, and two types of second horizontal reduction (resizing) processors 310 and 312. The first horizontal reduction (resizing) processor 301 reduces the RAW image data 101 obtained by the single-sensor color imaging device to an image of an arbitrary size in an input line direction. The memory section 303 temporarily stores the image data subjected to the horizontal resizing. The vertical reduction (resizing) processors 304, 306, and 308 perform reduction (resizing) on reduced line data read out from the memory section 303, in a vertical direction orthogonal to the input line direction. The second horizontal reduction (resizing) processors 310 and 312 reduce two of the three types of images subjected to the reduction (resizing) process in the horizontal and vertical directions to images of arbitrary sizes in the input line direction again.

In the reduction (resizing) to an arbitrary size performed by the first horizontal reduction (resizing) processor 301 that performs reduction to an image of an arbitrary size in the input line direction so as to generate to the three types of reduced-size images (i.e., the RAW image data 103 of the video standard size, the RAW image data 104 of the monitor display size, and the luminance (Y) image data 105 of the face detection data size), the image is reduced to a first reduced size, which is a horizontal size of the video standard size having the largest horizontal image size among the three reduced-size images by using a ratio K1, and generates image data 302 that is reduced only in a horizontal direction. The image data 302 obtained through the horizontal reduction (resizing) is temporarily written in the memory section 303 in units of line data. At the same time, data corresponding to a plurality of lines is read out from the memory section 303, and a reduction (resizing) process in the vertical direction, which is the next process, is performed.

To generate the first reduced data for video recording, the vertical reduction (resizing) processor 304 is used to reduce the data to a vertical size of the video standard size in the vertical direction by using the ratio K1 used in the above-described process, thereby obtaining data 103 with a desired size for video recording (video recording size data 103).

Then, to generate second reduced data for display monitor, the vertical reduction (resizing) processor 306 is used to reduce the data by using a ratio K2 to a second reduced size, which is a vertical size of the display monitor, in the vertical direction, and outputs an image 307 that is reduced to the monitor display size in the vertical direction. Subsequently, the dedicated second horizontal reduction (resizing) processor 310 is used to reduce the data by using a coefficient M2 satisfying a relationship of K1*M2=K2 in the input line direction again.

In addition, to generate third reduced data for face detection, the vertical reduction (resizing) processor 308 reduces the data by using a ratio K3 to a third reduced size, which is a size for face detection, in the vertical direction, and outputs an image 309 that is reduced to a size for face detection in the vertical direction. Subsequently, the dedicated second horizontal reduction (resizing) processor 312 reduces the data again by using a coefficient M3 satisfying a relationship of K1*M3=K3 in the input line direction, to obtain luminance (Y) image data 105 of a desired size for face detection.

Figure 5:
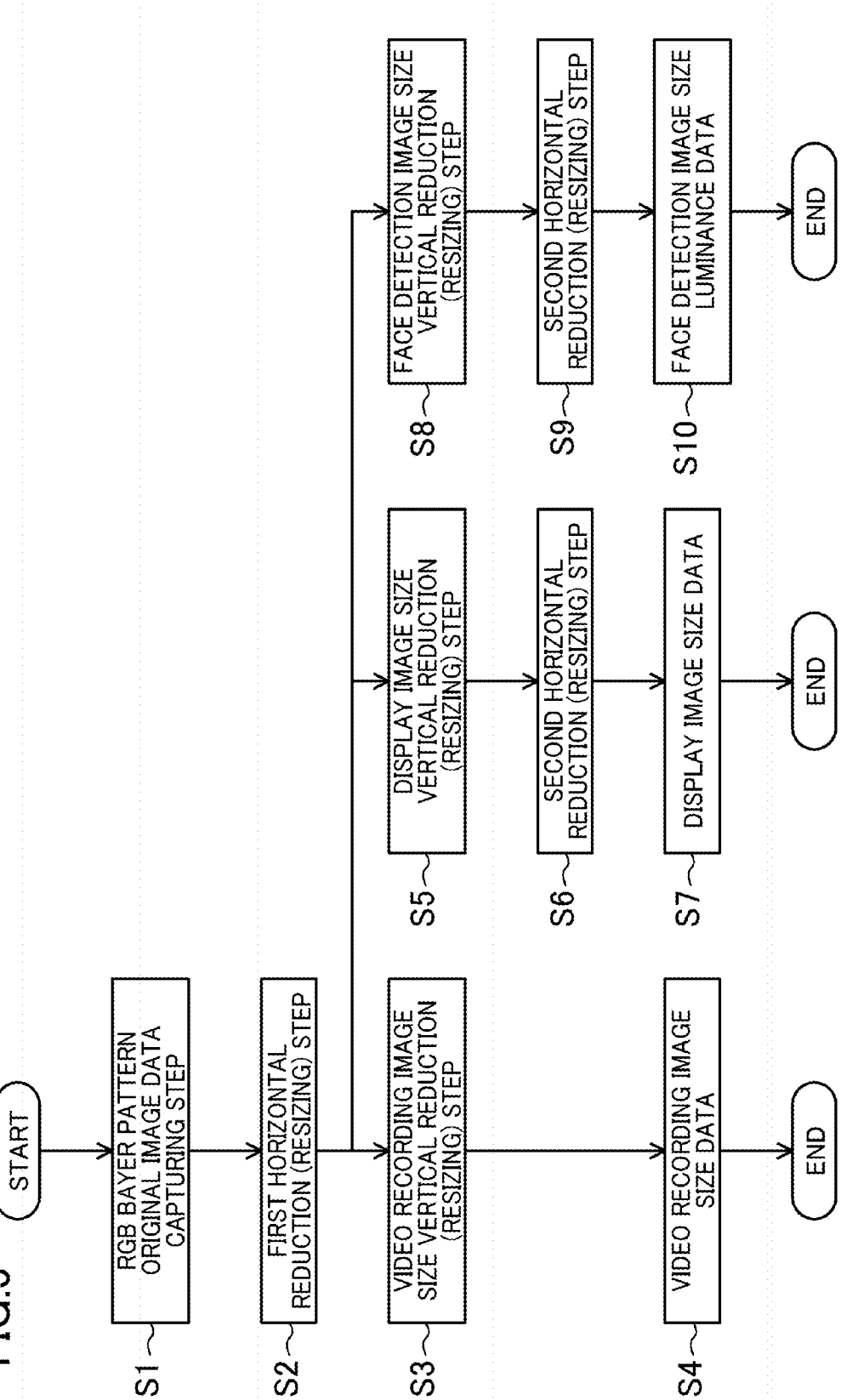
FIG. 5 is a flowchart showing a flow of the image processing illustrated in FIG. 3.

FIG. 5 is a flowchart showing image processing described with reference to FIG. 4. In FIG. 5, step S1 is a RGB Bayer pattern original image data capturing step, step S2 is a first horizontal reduction (resizing) step, step S3 is a video recording image size vertical reduction (resizing) step, step S4 is a video recording image size data output step, step S5 is a display image size vertical reduction (resizing) step, step S6 is a second horizontal reduction (resizing) step for a display image, step S7 is a display image size data output step, step S8 is a face detection image size vertical reduction (resizing) step, step S9 is a second horizontal reduction (resizing) step for face detection, and step S10 is a face detection image size luminance (Y) image data output step.

The image processing shown in the flowchart is a procedure performed in accordance with a program that can be executed by the CPU 114, and typically performs reading and writing from/in a memory for each process. Some of the processes may be performed with hardware processing. Operations in the processes are similar to those described with reference to FIG. 4.

(Horizontal Reduction (Resizing) Processor and Vertical Reduction (Resizing) Processor)

Figure 6:
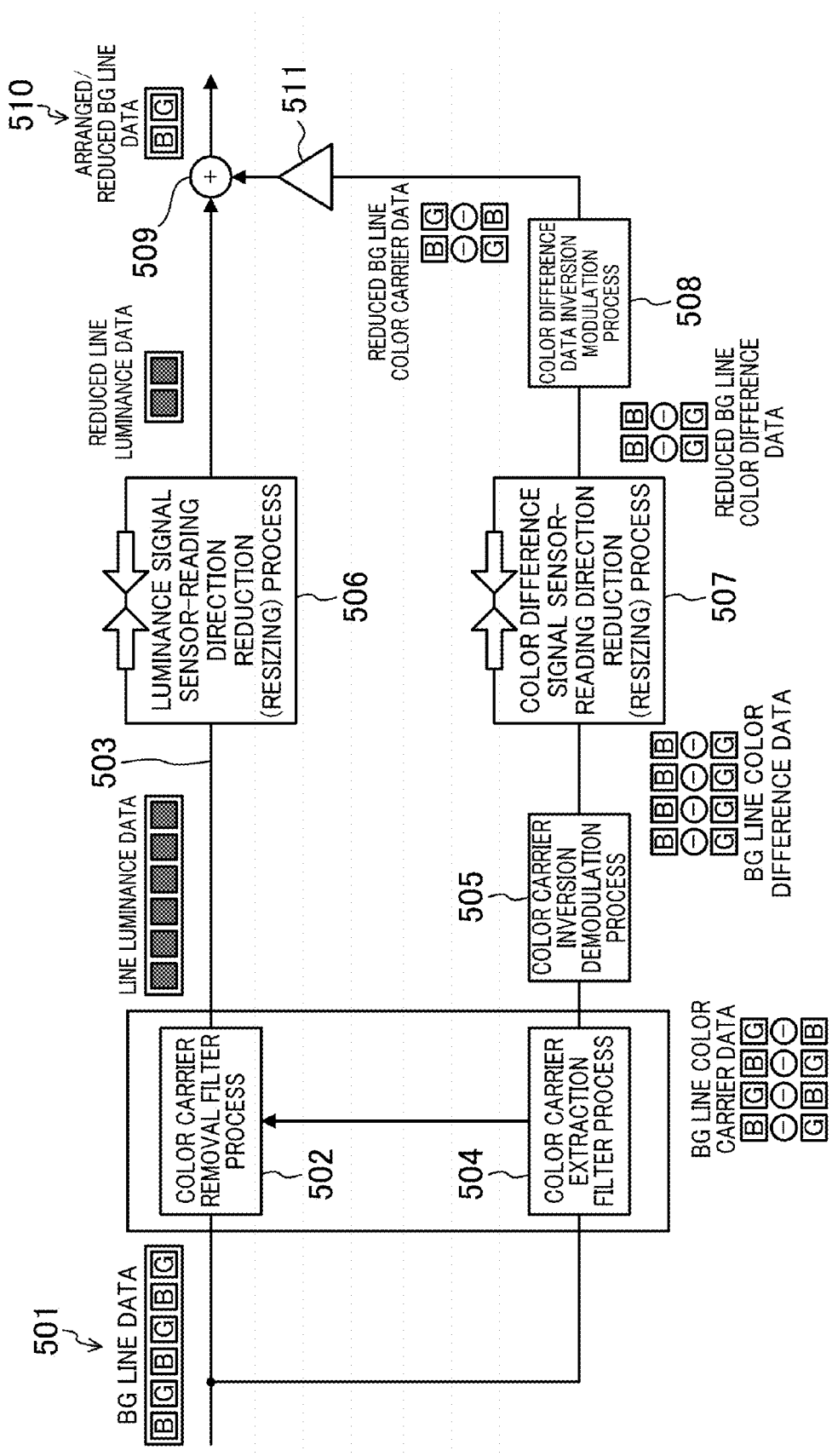
FIG. 6 illustrates an example of internal processing of first and second horizontal reduction (resizing) processors each of which reduces an image to an arbitrary size in an input line direction in generating images of different sizes in a pretreatment and RAW data reduction (resizing) processor.

FIG. 6 illustrates an example of internal processing of the first and second horizontal reduction (resizing) processors 301, 310, and 312 each of which reduces an image to an arbitrary size in the input line direction in generating images of different sizes in the pretreatment and RAW data reduction (resizing) processor 102.

Figure 7B:
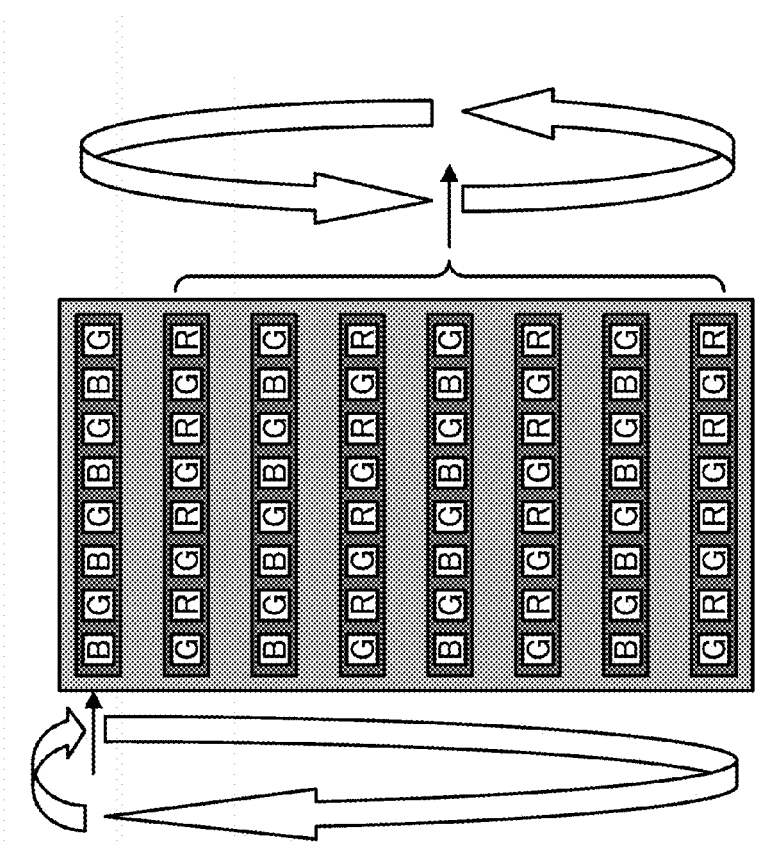
FIG. 7B illustrates write operation and read operation of the line memory at the next line cycle timing.
Figure 7A:
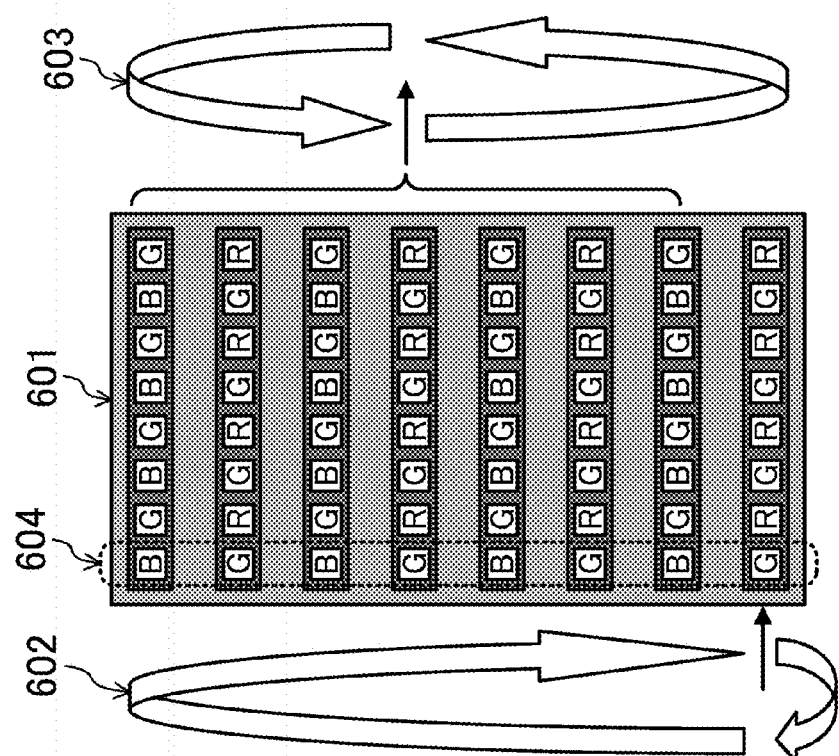
FIG. 7A illustrates write operation and read operation of a line memory.
Figure 9:
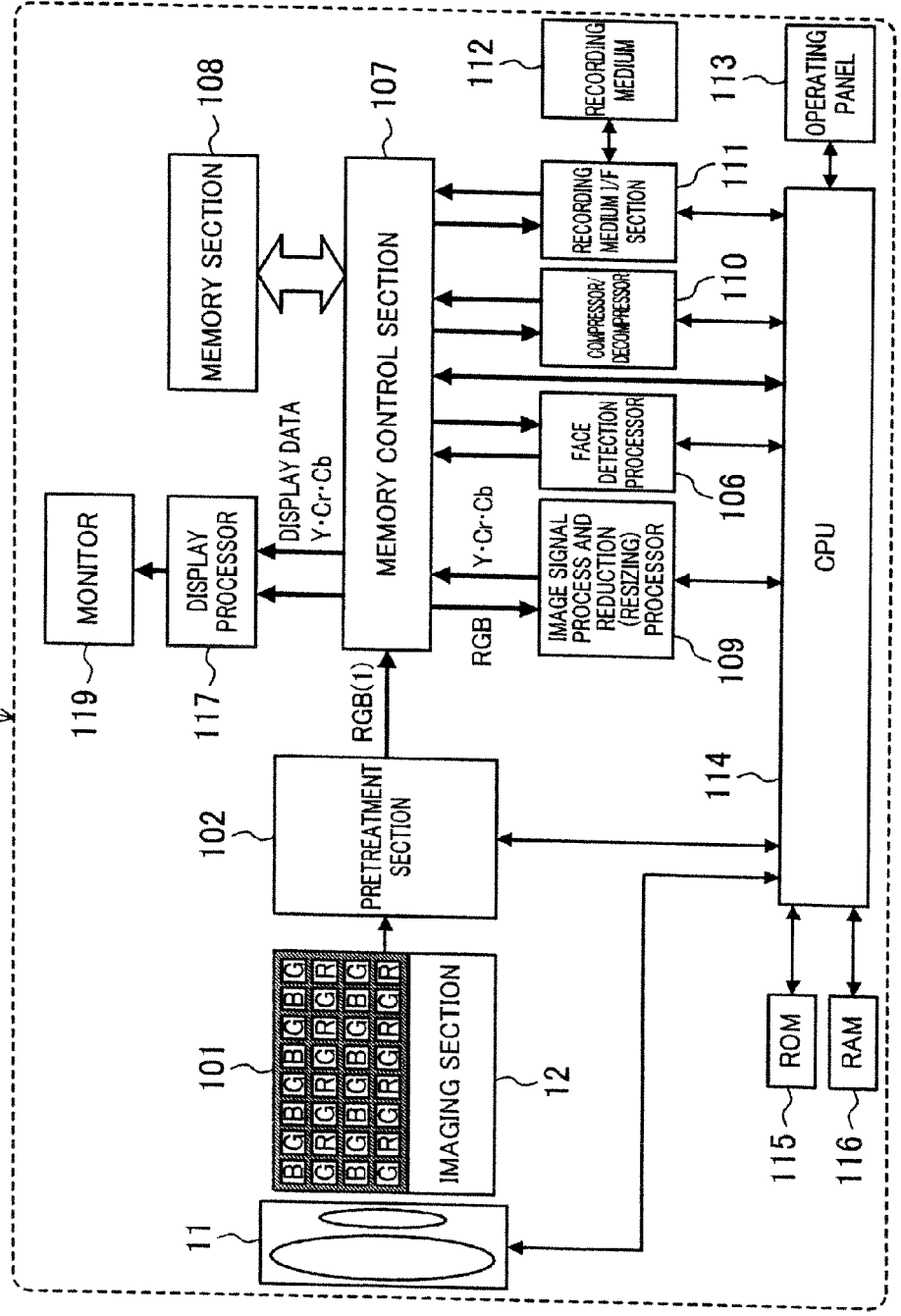
FIG. 9 is a conceptual view illustrating an internal signal processing block of a typical digital camera.

FIGS. 7A and 7B illustrate examples of the technique of temporarily writing image data 302 that has been horizontally resized in the first horizontal reduction (resizing) processor 301 in a plurality of line memories serving as an example of the memory section 303 and the technique of reading a plurality of pieces of horizontally reduced line data from the line memories at the same time.

FIG. 8 illustrates an example of internal processing of the vertical reduction (resizing) processors 304, 306, and 308 each of which reduces (resizes) a plurality of pieces of horizontally reduced line data in a vertical direction orthogonal to the input line direction.

Relationship among operations of the configurations illustrated in FIGS. 6-8 will be briefly described. First, as illustrated in FIG. 6, while a horizontal reduction (resizing) process is being performed in a sensor-reading direction, an output of this process is written in line memories illustrated in FIG. 7. At the same time, data corresponding to a series of lines in the image subjected to the horizontal reduction (resizing) process in the sensor-reading direction is read out from line memories, and a plurality of vertical reduction (resizing) processes are concurrently performed on pieces of data at the same position in the sensor-reading direction on a plurality of lines as illustrated in FIG. 8. In this case, the vertical reduction (resizing) processes are different from the horizontal reduction (resizing) process in the sensor-reading direction described above, and are performed based on the process of determining whether or not an output of an operation which is performed for a plurality of lines at a time is to be used on a line-by-line basis. Then, in the vertical reduction (resizing) processes, images that have been reduced (resized) with different ratios in the vertical direction are obtained as intermittent outputs from the lines. A horizontal reduction (resizing) process in the sensor-reading direction illustrated in FIG. 6 is additionally performed on an arbitrary image to obtain a plurality of images that have been reduced (resized) with an identical vertical and horizontal reduction ratios.

A main feature of this embodiment is in a flow of image processing and the combination and order of processes. Specifically, the process of FIG. 6, the process of FIGS. 7A and 7B, the process of FIG. 8, and the process of FIG. 6 are combined and performed in this order to generate a plurality of reduced (resized) images.

The processes illustrated in FIGS. 6, 7A, 7B, and 8 constitute the technique of generating reduced RAW data and reduced luminance image data with high quality and high resolution without occurrence of aliasing noise in a reduction (resizing) process of RAW data. This embodiment is not intended to limit an internal algorithm uniquely, which is a basis of a high-quality reduction process. The internal algorithm employed in this embodiment is a procedure capable of obtaining high-quality images by reduction process with a small number of steps in order to reduce redundant processes, which is a purpose of the present disclosure. That is, the internal algorithm employed in this embodiment is a reduction algorithm suitable for obtaining image processing of the present disclosure.

(Internal Processing in Horizontal Reduction (Resizing) Processor)

Referring now to FIG. 6, the horizontal reduction (resizing) processor 301 for horizontal reduction (resizing) in the sensor-reading direction will be described in detail.

The horizontal reduction (resizing) processor 301 performs a one-dimensional pipeline process that includes a color carrier removal filter process 502, a color carrier extraction filter process 504, a color carrier inversion demodulation process 505, a luminance signal sensor-reading direction reduction (resizing) process 506, a color difference signal sensor-reading direction reduction (resizing) process 507, a color difference data inversion modulation process 508, a gain adjustment process 511, and a color array reproduction process 509, as illustrated in FIG. 6. The color carrier removal filter process 502 extracts luminance data from a RAW image 101 by a filter process performed on a RAW line image 501 on a line-by-line basis. The color carrier extraction filter process 504 extracts color carrier data. The color difference data inversion demodulation process 505 performs color inversion demodulation on modulated color carrier data to output continuous color difference data. The luminance signal sensor-reading direction reduction (resizing) process 506 and the color difference signal sensor-reading direction reduction (resizing) process 507 reduce (resize) the luminance data and the color difference data independently of each other. The color difference data inversion modulation process 508 converts the resized color difference data back into color carrier data. The gain adjustment process 511 performs gain level adjustment on the color carrier data. The color array reproduction process 509 recombines the level-adjusted resized luminance data and the gain-adjusted and modulated color carrier data to generate a plurality of pieces of final color array data.

It will now be described how an image having the Bayer pattern is processed using the horizontal reduction (resizing) process function in the sensor-reading direction described in detail with reference to FIG. 6.

The RAW image 101, which is an original image, is a mosaic image in which the pixel positions of the Bayer array are maintained, and is typically read out from the imaging section 12 on a line-by-line basis. The RAW line image data 501 of the original image on a line-by-line basis includes two types of lines: RG lines in which red (R) information alternates with green (G) information on a pixel-by-pixel basis; and BG lines in which blue (B) information alternates with G information on a pixel-by-pixel basis. The two types of line data are subjected to the color carrier removal filter process 502 which removes a color carrier close to a Nyquist frequency varying at intervals of two pixels, so that luminance data $\{\alpha(R+G)\}$ which is an average value of R and G is output for the RG lines, and luminance data $\{\alpha(B+G)\}$ which is an average value of B and G is output for the BG lines.

The two types of line data are also subjected to the color carrier extraction filter process 504 that extracts a color carrier close to the Nyquist frequency varying at intervals of two pixels, so that RG line color carrier data modulated with the Nyquist frequency is output for the RG lines, and BG line color carrier data modulated with the Nyquist frequency is output for the BG lines. The RG line color carrier data and the BG line color carrier data modulated with the Nyquist frequency are subjected to the color difference data inversion demodulation process 505 that performs sign reversal on a pixel-by-pixel basis, to be output as continuous RG line color difference data and BG line color difference data.

When the extracted luminance data and color difference data are subjected to reduction (resizing) in the sensor-reading direction with the same reduction ratio, a luminance data band-limiting filter process and a color difference data band-limiting filter process (not shown in FIGS. 7A and 7B) having different characteristics are performed on the luminance data and the color difference data, respectively, so as to reduce aliasing noise occurring after the reduction. In this case, assuming that the final recording format is JPEG, TIFF, or MPEG, the color difference band limitation is preferably set to be smaller than or equal to ½ of the luminance band limitation. The band-limited luminance data is subjected to a linear interpolation/decimation process in accordance with a reduction ratio in the luminance signal sensor-reading direction reduction (resizing) process 506. On the other hand, the band-limited color difference data is subjected to linear interpolation/decimation in accordance with a reduction ratio in the sensor-reading direction reduction (resizing) process 507 in the color difference signal sensor-reading direction.

The two types of continuous color difference data $\{\beta(R-G), \beta(B-G)\}$ subjected to the horizontal reduction (resizing) in the sensor-reading direction on a line-by-line basis is subjected to the color difference data inversion modulation process 508 that performs sign reversal at every pixel and is an equivalent process to modulation with the Nyquist frequency varying at intervals of two pixels. As a result, two types of reduced RG line color carrier data and reduced BG line color carrier data, i.e., {β(R−G), −β(R−G)} and {β(B−G), −β(B−G)}, having different sign for each pixel on each line data are obtained.

The resized reduced line luminance data is then subjected to the color array reproduction process 509 in which the resized reduced line luminance data and the resized color carrier data are added together, so that reduced RG line color carrier data and reduced BG line color carrier data are recombined together for each line. As a result, reduced (resized) RG lines 510 in which R (red) information alternates with G (green) information for each pixel and resized BG lines 510 in which B (blue) information alternates with G (green) information for each pixel are output.

The recombination of the RG lines is indicated by the following mathematical expression. Initially, when it is assumed that α=0.5 and β=0.5, the luminance data {α(R+G)} and the color carrier data {β(R−G), −β(R−G)} are luminance data {0.5(R+G)} and color carrier data {0.5(R−G), −0.5(R−G)}. As luminance data is repeatedly added for every pixel, 0.5 {(R+G)+(R−G)}, 0.5 {(R+G)−(R−G)}, ... are repeatedly calculated. Thus, RG line data is reproduced as R, G, R, G, ....

Similarly, the recombination of the BG lines is indicated by the following mathematical expression. Initially, when it is assumed that α=0.5 and β=0.5, the luminance data {α(B+G)} and the color carrier data {β(B−G), −β(B−G)} are luminance data {0.5(B+G)} and color carrier data {0.5(B−G), −0.5(B−G)}. As luminance data is repeatedly added for every pixel, 0.5{(B+G)+(B−G)}, 0.5{(B+G)−(B−G)}, ... are repeatedly calculated. Thus, BG line data is reproduced as B, G, B, G, ....

The coefficients α and β of luminance data and color difference data are set to adjust the gains of the data before the addition process so that the gain of the combined data is substantially equal to the gain of the input. The purpose of this adjustment is to generate a single separate color component R, G, or B from two signal components, i.e., a luminance signal and a color difference signal. Thus, the gain adjustment does not necessarily need to be performed before the calculation, and may be performed after separate RGB color components are obtained.

The horizontal reduction (resizing) process function in the sensor-reading direction shown in FIG. 6 can be used in performing the reduction (resizing) processes 301 and 310 shown in FIG. 4.

When being used in the reduction (resizing) process 312 of generating luminance (Y) data for face detection, a gain of color carrier data input to the addition process 509 of adding resized reduced line luminance data and resized color carrier data as zero in the gain adjustment process 511. In this manner, only luminance data is output.

Referring now to FIGS. 7A and 7B, it will be described how RAW image data that has been horizontally resized by the first horizontal reduction (resizing) processor 301 is temporarily written in a plurality of line memories serving as an example of the memory section 303 and, at the same time, a plurality of pieces of horizontally reduced line RAW data are read out from the line memories.

FIG. 7A shows write operation and read operation of a line memory in this case. FIG. 7B shows write operation and read operation of the line memory at the next line cycle timing following FIG. 7A. In FIGS. 7A and 7B, reference character 601 denotes a line memory including eight lines. Reference character 602 denotes a data write cycle for the line memory 601. A write control with respect to the eight lines is performed such that the lines are successively subjected to write operation on a line-by-line basis and in a ring cyclic manner.

Reference character 603 denotes a data read cycle for the line memory 601. The lines are successively subjected to read operation in a ring cyclic manner as in the write control, but memory data on seven of the eight lines is selected together in each read operation step.

In the example of FIGS. 7A and 7B, in order to minimize the capacity of the line memory 601 to be used, the position of the leading line of the 7-line simultaneous cyclic read operation is delayed by one line from the position of a write line. By separating the write line from the read lines, write operation and read operation can be asynchronously performed.

A plurality of successive lines of RAW resized data from the RAW reduction (resizing) images 302 are read together from the line memory 601 illustrated in FIGS. 7A and 7B. The vertical three vertical reduction (resizing) processes 304, 306, and 308 are concurrently performed on data 604 located at the same position in the sensor-reading direction on the plurality of lines, to obtain RAW resized images 305, 307, and 309.

In this case, the vertical reduction (resizing) processes 304, 306, and 308 are different from the horizontal reduction (resizing) process 301 in the sensor-reading direction. These vertical reduction (resizing) processes 304, 306, and 308 are performed by reducing the number of output lines depending on the result of the determination process of determining whether or not any image processing output data from a plurality of lines is utilized as effective data on a line-by-lie basis.

(Internal Processing of Vertical Reduction (Resizing) Processor)

FIG. 8 illustrates a detailed procedure of the three vertical reduction (resizing) processors 304, 306, and 308 illustrated in FIG. 4 when the line memory 601 illustrated in FIGS. 7A and 7B is used.

The vertical reduction (resizing) process shown in FIG. 8 is a two-line process including a luminance signal process and a color difference signal process as in the horizontal reduction (resizing) process performed in the sensor-reading direction shown in FIG. 6.

Note that, in FIG. 8, seven pixels located at the same horizontal position in the vertical direction are handled as a processing unit with respect to seven lines of RAW image as input data.

The vertical reduction (resizing) process illustrated in FIG. 8 includes a color carrier removal filter process 703, a color carrier extraction filter process 712, a color carrier inversion demodulation process 716, a luminance signal vertical reduction (resizing) process 710, a color difference signal vertical reduction (resizing) process 718, a color difference data inversion modulation process 720, and a color array reproduction process 722. The color carrier removal filter process 703 extracts luminance data in the vertical direction from the seven lines of RAW image. The color carrier extraction filter process 712 extracts vertical color carrier data. The color carrier inversion demodulation process 716 performs color inversion demodulation on the vertically modulated color carrier data to output color difference data that is continuous in the vertical direction. The luminance signal vertical reduction (resizing) process 710 and the color difference signal vertical reduction (resizing) process 718 perform vertical reduction (resizing) on the luminance data and the color difference data independently of each other. The color difference data inversion modulation process 720 converts the resized color difference data back into color carrier data and performs gain level adjustment on the color carrier data. The color array reproduction process 722 recombines the level-adjusted resized luminance data and the modulated color carrier data to generate a plurality of pieces of final color array data.

It will now be described how an image having a Bayer pattern is subjected to a reduction (resizing) process by using the vertical resizing process function specifically described with reference to FIG. 8.

As shown in a processing unit 701 in the vertical direction in FIG. 8, a RAW image subjected to the horizontal resizing process holds a mosaic pattern in which the pixel positions of the Bayer array are maintained, and is written in the line memory 601 on a line-by-line basis in a cyclic manner or is read out from a plurality of lines at a time in a cyclic manner as illustrated in FIG. 7. In this embodiment, the line memory 601 includes eight lines, and the outputs of seven lines are output together.

The seven-line input data after the horizontal resizing process, i.e., the first vertical processing unit 701 and a second vertical processing unit 702, is vertical data of interest located at the same position in the sensor-reading direction on seven lines, and is one of two types of units: a BG vertical processing unit 701 in which blue (B) information alternates with green (G) information on a pixel-by-pixel basis in the vertical direction; and a GR vertical processing unit 702 in which green (G) information alternates with red (R) information on a pixel-by-pixel basis in the vertical direction.

Data to be these two types of processing units in the vertical direction contains color carrier information close to the Nyquist frequency varying at intervals of two pixels in the vertical direction, and is subjected to a three-line process using data Y1-Y3 corresponding to five lines in the 7-line data in the color carrier removal filter process 703 of removing the color carrier. In this manner, three types of continuous pieces of luminance data whose positions are shifted from one another by one line in the vertical direction are generated. In this embodiment, each of three types of line luminance data 709 is output by using data Y1-Y3 of five pixels in the vertical direction in the color carrier removal filter 703. Each of the pieces of data Y1-Y3 is luminance data that is an average value of blue (B) and green (G) in a BG vertical processing unit 901 in the vertical direction, and is luminance data that is an average value of green (G) and red (R) in the next GR vertical processing unit 702 in the vertical direction. These pieces of luminance data is alternately output in the horizontal direction.

The two types of the vertical processing units 701 and 702 are subjected to a three-line process by using data C1-C3 corresponding to five lines in the 7-line data in the color carrier extraction filter process 712 of extracting a color carrier close to the Nyquist frequency varying at intervals of two pixels in the vertical direction, and thereby, three types of continuous pieces of color carrier data whose positions are shifted from one another by one line in the vertical direction are generated. In the BG vertical direction of the BG vertical processing unit 701, BG color carrier component data modulated with the Nyquist frequency is output. In the GR vertical direction of the GR vertical processing unit 702, GR color carrier component data modulated with the Nyquist frequency is output.

The three pieces of each of the BG color carrier component data and the GR color carrier component data modulated with the Nyquist frequency in the vertical direction are subjected to the color carrier inversion demodulation process 716 of performing sign reversal for each pixel (for each one-line operation) in the vertical direction, and are output as R−G data and B−G data that are continuous in the vertical direction. Here, data C1-C3 at the same position is output such that the pixel data positions of the data C1-C3 in the vertical direction are made coincide with those of the luminance data Y1-Y3.

When the two types of extracted data in the vertical direction, i.e., the luminance data and the color difference data, are subjected to vertical reduction (resizing) with the same ratio, a luminance band-limiting filter process and a color difference band-limiting filter process having different characteristics are preferably performed on the luminance data and the color difference data, respectively, so as to reduce aliasing noise occurring after the reduction. These processes can also be performed on three lines of the luminance data Y1-Y3 and the color carrier data C1-C3. However, to achieve an effective assembly, the limitation of frequency characteristics is applied at a time in the color carrier removal filter process 703 and the color carrier extraction filter process 712. In this case, assuming that the final recording format is JPEG, TIFF, or MPEG, the color difference band limitation is preferably set to be smaller than or equal to ½ of the luminance band limitation.

In the luminance signal vertical reduction (resizing) process 710, the vertically band-limited luminance data is subjected to linear interpolation in the vertical direction by using three pieces of line luminance data 709 with respect to the luminance data Y1-Y3, and to line decimation on a line-by-line basis in accordance with a reduction ratio. On the other hand, in the color difference signal vertical reduction (resizing) process 718, linear interpolation similar to that for the luminance data is performed in the vertical direction by using three pieces of color difference line data, and line decimation is performed on a line-by-line basis in accordance with a vertical reduction ratio, thereby generating an output.

The color difference data 719 reduced (resized) through the line decimation in the vertical direction is subjected to the color difference data inversion modulation process 720 of performing sign reversal for each effective line output, which is an equivalent process for modulating the data with the Nyquist frequency varying at intervals of two pixels in the vertical direction. The vertically reduced (resized) line luminance data obtained through the line decimation in the vertical direction and the color carrier data are added together in the color array reproduction process 722, thereby alternately outputting, in the horizontal direction, horizontally and vertically resized vertical BG data 723 in which blue (B) information alternates with green (G) information in the vertical direction at every pixel, and horizontally and vertically resized vertical GR data in which green (G) information alternates with the red (R) information in the vertical direction at every pixel.

Using the vertical reduction (resizing) process function shown in FIG. 8, vertical reduction (resizing) processes in the three processors 304, 306, and 308 illustrated in FIG. 4 are performed. When vertical reduction (resizing) processes are performed in the two processors 306 and 308, these vertical reduction (resizing) processes are performed with reduction ratios different from that of the processor 304.

In addition, when the process function shown in FIG. 8 is used in the vertical reduction (resizing) process in the processor 308, a gain of line color carrier data to be input to the addition process 722 of adding resized (reduced) line luminance data 711 and the resized line color carrier data together is added as zero in the gain adjustment process 724 in order to generate luminance data for face detection, thereby outputting only the line luminance data.

Among the video recording size data 103, the monitor display size data 307, and the face detection size data 309 obtained through the processes shown in FIG. 8, the display size data 307 is subjected to the sensor-reading direction resizing process 310 shown in FIG. 4 again, thereby obtaining a desired image. The face detection size data 309 is subjected to the sensor-reading direction resizing process 312 shown in FIG. 4 again. In this case, as described above, in the internal processing illustrated in FIG. 6, a gain of color carrier data to be input to the addition process 509 of adding the reduced line luminance data resized in the sensor-reading direction and the color carrier data together is added as zero in the gain adjustment process 511, thereby obtaining luminance data only. In this manner, desired luminance image for face detection can be obtained.

As described above, as illustrated in FIG. 2, the pretreatment and RAW data reduction (resizing) processor 102 performs a flow of image processing in which the process of FIG. 6, the process of FIGS. 7A and 7B, the process of FIG. 8, and the process of FIG. 6 are performed in this order and a procedure, thereby generating a plurality of reduced (resized) images for face detection in the first frame period.

Then, in the second frame period, the obtained RAW resized reduced-size images 103, 104, and 105 are input to the image signal process and reduction (resizing) processor 109 illustrated in FIGS. 1 and 2, where main signal processes (display image generation and video recording image generation in a monitor mode). The obtained RAW resized reduced-size images 103, 104, and 105 are also input to the face detection processor 106, where face detection with a small frame delay is performed.

Figure 10:
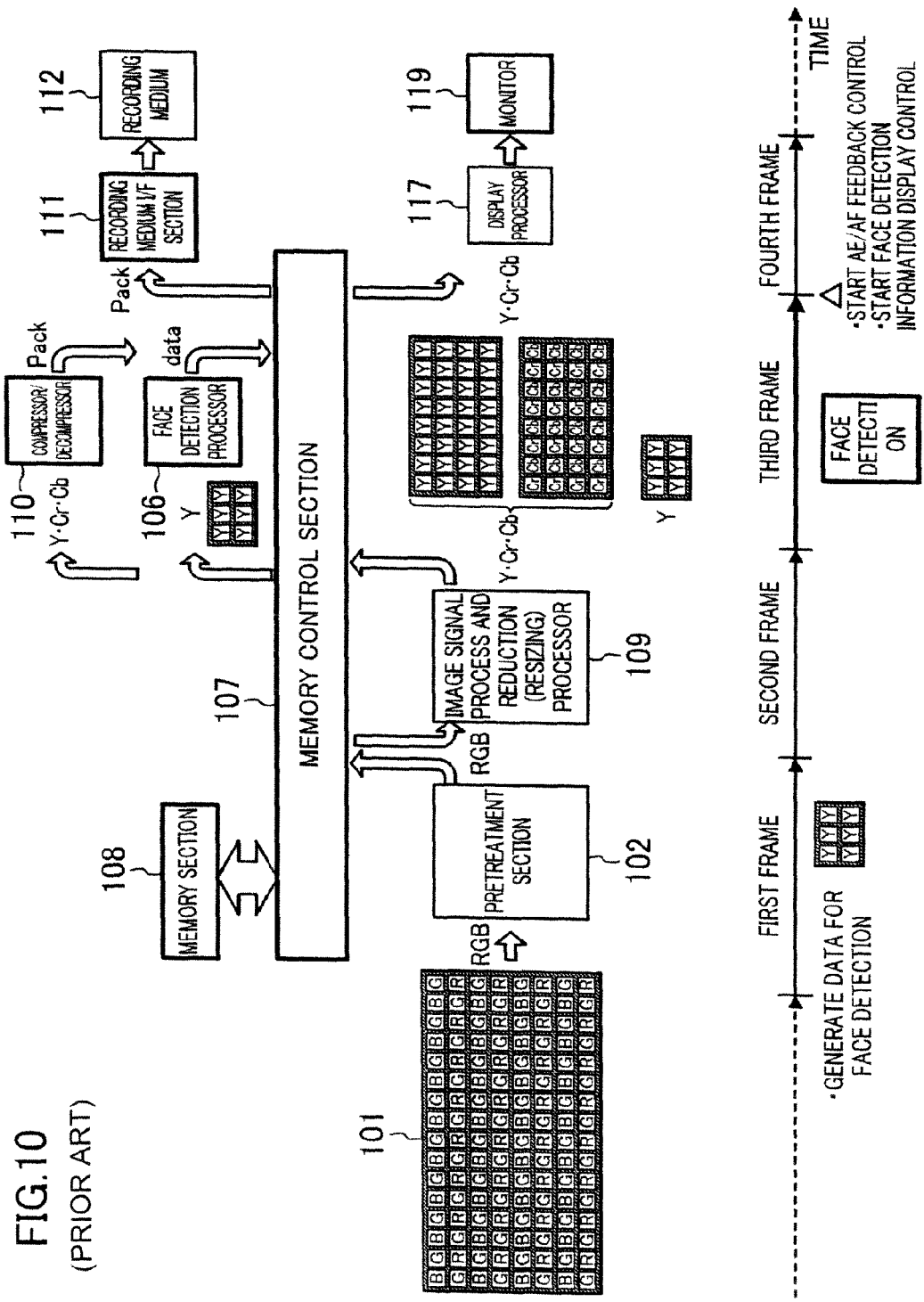
FIG. 10 illustrates a flow of typical image processing.

Accordingly, this embodiment enables face detection information display control and AF/AE feedback control to start earlier by one frame period than in a case where face detection information display control and AF/AE feedback control are performed in the third frame period as in the conventional example illustrated in FIG. 10. In addition, it is also possible to use the third frame period for performing detail detection and recognition based on the face position detected and acquired in the second frame period.

Means for carrying out the present disclosure is not limited to a dedicated image processor (e.g., an image reproduction device or an image processing device), and may be a personal computer. The whole or a part of the image processing may be implemented not only by hardware (e.g., a signal processing circuit), but also by software.

The image processing program of this embodiment may be configured as a separate application software program, or may be incorporated as a part of an application, such as an image processing software program or a file management software program. The image processing program of this embodiment is not limited to applications to a computer system, such as a personal computer, or may be used as an operating program for a central processing unit (CPU) incorporated in an information device, such as a digital camera or a cellular phone.

As described above, an image processor, an image processing method, and an image processing program according to the present disclosure can be useful especially for an image data size changing device, an electronic still camera, an image data size changing program, etc., suitable for a reduction process of an original image obtained from a single-sensor color imaging device.

What is claimed is:

1. An image processor for use in an imaging system that generates at least one of a still image or a video image from an original image output from an imaging device and having pixels of a plurality of colors arranged in a color array with a periodicity and records the at least one of the still image or the video image, the image processor comprising:

a pretreatment section configured to generate a plurality of reduced-size images with respect to the original image;

a memory section configured to hold the reduced-size images temporarily via a memory control section;

a face information detector configured to detect face information via the memory control section with respect to one of the reduced-size images read out from the memory section; and a central processing unit configured to perform at least one of focus control or exposure control for a specific area based on the face information detected by the face information detector, wherein the pretreatment section includes a first horizontal reduction resizing processor configured to reduce, in an input line direction, the original image to a reduced-size image of an arbitrary size, and to store the reduced-size image of the arbitrary size temporarily, a plurality of vertical reduction resizing processors each configured to read the reduced-size image reduced in the input line direction from the memory section by the first horizontal reduction resizing processor, and to reduce the reduced-size image to an image of an arbitrary size in a vertical direction orthogonal to the input line direction, and a plurality of second horizontal reduction resizing processors each configured to reduce reduced-size images reduced in size in the horizontal and vertical directions and obtained by the vertical reduction resizing processors again to images of an arbitrary size in the input line direction.

2. The image processor of claim 1, wherein when the pretreatment section generates n types, where n is an integer of four or more, of reduced-size images, the first horizontal reduction resizing processor reduces the original image to an image of a horizontally reduced size of one of the n-types of reduced-size images having a largest horizontal image size, with a ratio K1, one of the vertical reduction resizing processors reduces the reduced-size image reduced with the ratio K1 in the input line direction, with the ratio K1 in the vertical direction, another of the vertical reduction resizing processors reduces the reduced-size image reduced with the ratio K1 in the input line direction, with a ratio K2 in the vertical direction, yet another of the vertical reduction resizing processors reduces the reduced-size image reduced with the ratio K1 in the input line direction, with a ratio K3 in the vertical direction, each of the other (n−3) vertical reduction resizing processors reduces the reduced-size image reduced with the ratio K1 in the input line direction, with a ratio Kn in the vertical direction, the number of the second horizontal reduction resizing processors is n−1, one of the second horizontal reduction resizing processors reduces the reduced-size image reduced with the ratio K2 in the vertical direction, with a coefficient M2 satisfying a relationship of K1*M2=K2 in the input line direction, another one of the second horizontal reduction resizing processors reduces the reduced-size image reduced with the ratio K3 in the vertical direction, with a coefficient M3 satisfying a relationship of K1*M3=K3 in the input line direction, and each of the other second horizontal reduction resizing processors reduces the reduced-size image reduced with the ratio Kn in the vertical direction, with a coefficient Mn satisfying a relationship of K1*Mn=Kn in the input line direction.

3. The image processor of claim 1, wherein
when the pretreatment section generates a reduced-size image for face detection from the original image, the pretreatment section generates a reduced image of a luminance signal component having no color carrier components by performing:
  a color carrier removal process in the input line direction; and
  a color carrier removal process in the vertical direction.

4. The image processor of claim 1, wherein
among the plurality of reduced-size images generated by the pretreatment section, an image having a largest horizontal image size is an image for video recording conforming to a high-definition video standard, and
each of the other reduced-size image(s) is an image for display or image recognition such as face recognition.

5. The image processor of claim 1, wherein
the original image is an image obtained by using a single-sensor color imaging device and has a plurality of pixels of colors arranged in a color array with a periodicity through a primary color filter.

6. The image processor of claim 1, wherein
the pretreatment section generates a plurality of reduced-size images in a first frame period in which the original image is input to the image processor, and
the face information detector detects face information in a second frame period subsequent to the first frame period.

7. An image processing method for use in an imaging system that generates at least one of a still image or a video image from an original image output from an imaging device and having pixels of a plurality of colors arranged in a color array with a periodicity and records the at least one of the still image or the video image, the method comprising:
  a pretreatment step of generating a plurality of reduced-size images with respect to the original image;
  a face information detection step of detecting face information with respect to one of the reduced-size images; and
  an imaging control step of performing at least one of focus control or exposure control for a specific area based on the face information detected in the face information detection step, wherein
  the pretreatment step include
    a first horizontal reduction resizing process of reducing, in an input line direction, the original image to an image of an arbitrary size,
    a plurality of vertical reduction resizing processes of each reducing the reduced-size image that has been reduced in the input line direction in the first horizontal reduction resizing process to an image of an arbitrary size in a vertical direction orthogonal to the input line direction, and
    a plurality of second horizontal reduction resizing processes of each reducing reduced-size images that have been reduced in size in the horizontal and vertical directions and obtained in the vertical reduction resizing processes again to images of an arbitrary size in the input line direction.

8. The image processing method of claim 7, wherein
when n-types, where n is an integer of four or more, of reduced-size images are generated in the pretreatment step,
in the first horizontal reduction resizing process, the original image is reduced to an image of a horizontally reduced size of one of the n-types of reduced-size images having a largest horizontal image size, with a ratio K1,
in one of the vertical reduction resizing processes, the reduced-size image that has been reduced with the ratio K1 in the input line direction, is reduced with the ratio K1 in the vertical direction,
in another of the vertical reduction resizing processes, the reduced-size image that has been reduced with the ratio K1 in the input line direction is reduced with a ratio K2 in the vertical direction,
in yet another of the vertical reduction resizing processes, the reduced-size image that has been reduced with the ratio K1 in the input line direction is reduced with a ratio K3 in the vertical direction,
in each of the other (n−3) vertical reduction resizing processes, the reduced-size image that has been reduced with the ratio K1 in the input line direction is reduced with a ratio Kn in the vertical direction,
the number of the second horizontal reduction resizing processes is n−1,
in one of the second horizontal reduction resizing processes, the reduced-size image that has been reduced with the ratio K2 in the vertical direction is reduced in the input line direction with a coefficient M2 satisfying a relationship of K1*M2=K2,
in another of the second horizontal reduction resizing processes, the reduced-size image that has been reduced with the ratio K3 in the vertical direction is reduced in the input line direction with a coefficient M3 satisfying a relationship of K1*M3=K3,
in each of the other (n−3) second horizontal reduction resizing processes, the reduced-size image that has been reduced with the ratio Kn in the vertical direction is reduced in the input line direction with a coefficient Mn satisfying a relationship of K1*Mn=Kn.

9. The image processing method of claim 7, wherein
in the pretreatment step,
when generating a reduced-size image for face detection from the original image, a reduced-size image of a luminance signal component having no color carrier components is generated by performing:
  a color carrier removal process concurrently with the first horizontal reduction resizing process; and
  a color carrier removal process concurrently with the vertical reduction resizing process.

10. The image processing method of claim 7, wherein
among the plurality of reduced-size images generated in the pretreatment step, an image having a largest horizontal image size is an image for video recording conforming to a high-definition video standard, and
each of the other reduced-size image(s) is an image for display or image recognition such as face recognition.

11. The image processing method of claim 7, wherein
the original image is an image obtained by using a single-sensor color imaging device and has a plurality of pixels of colors arranged in a color array with a periodicity through a primary color filter.

12. The image processing method of claim 7, wherein
in the pretreatment step, a plurality of reduced-size images are generated in a first frame period in which the original image is input in the pretreatment step, and
in the face information detection step, face information is detected in a second frame period subsequent to the first frame period.

13. A digital camera comprising the image processor defined in claim 1.

* * * * *